[12] United States Patent
Abedini et al.

(10) Patent No.: US 12,250,680 B2
(45) Date of Patent: Mar. 11, 2025

(54) CONFIGURABLE REPEATERS

(71) Applicant: QUALCOMM Incorporated, San Diego, CA (US)

(72) Inventors: Navid Abedini, Basking Ridge, NJ (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 17/652,080

(22) Filed: Feb. 22, 2022

(65) Prior Publication Data

US 2023/0269736 A1 Aug. 24, 2023

(51) Int. Cl.
*H04W 72/00* (2023.01)
*H04B 7/15* (2006.01)
*H04W 72/044* (2023.01)
*H04W 72/20* (2023.01)

(52) U.S. Cl.
CPC .............. *H04W 72/20* (2023.01); *H04B 7/15* (2013.01); *H04W 72/046* (2013.01)

(58) Field of Classification Search
CPC ....... H04W 72/20; H04W 72/046; H04B 7/15
See application file for complete search history.

(56) References Cited

U.S. PATENT DOCUMENTS

| | | | |
|---|---|---|---|
| 2019/0158162 A1 | 5/2019 | Ryu et al. | |
| 2021/0352767 A1 | 11/2021 | Paladugu et al. | |
| 2023/0130003 A1* | 4/2023 | Ali | H04W 16/28 370/329 |

FOREIGN PATENT DOCUMENTS

WO WO-2018070645 A1 * 4/2018 ........... H04L 1/0061

OTHER PUBLICATIONS

International Search Report and Written Opinion—PCT/US2023/012737—ISA/EPO—May 4, 2023.

* cited by examiner

*Primary Examiner* — Erika A Washington
(74) *Attorney, Agent, or Firm* — QUALCOMM Incorporated

(57) ABSTRACT

The apparatus may be configured to receive a plurality of sets of RU configuration parameters, receive an indication of a first set of RU configuration parameters in the plurality of sets of RU configuration parameters, and perform at least one repeating operation based on the first set of RU configuration parameters to facilitate a communication between a first wireless device and a second wireless device. In an aspect of the disclosure, the apparatus may be configured to transmit, to a RU, a plurality of sets of RU configuration parameters and transmit, to the RU, an indication of a first set of RU configuration parameters in the plurality of sets of RU configuration parameters for the RU to perform at least one repeating operation associated with facilitating a communication between the first UE and one of the control node or the second wireless device.

30 Claims, 14 Drawing Sheets

CONFIGURABLE REPEATERS

TECHNICAL FIELD

The present disclosure relates generally to communication systems, and more particularly, to a configurable repeater for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive a plurality of sets of repeater unit (RU) configuration parameters. The apparatus may also be configured to receive an indication of a first set of RU configuration parameters in the plurality of sets of RU configuration parameters. The apparatus may further be configured to perform at least one repeating operation based on the first set of RU configuration parameters, the at least one repeating operation being performed to facilitate a communication between a first wireless device and a second wireless device.

In an aspect of the disclosure, a method, a computer-readable medium, and an apparatus are provided. The apparatus may be configured to receive, from at least one of a base station, a RU, or a second UE, a plurality of sets of RU configuration parameters associated with one of a beam index, a UE index, or a parameter set index. The apparatus may further be configured to communicate, via a RU, with one of the second UE or the base station based on a first set of RU configuration parameters in the plurality of sets of RU configuration parameters, the RU being associated with the plurality of sets of RU configuration parameters.

In an aspect of the disclosure, a method, a computer-readable medium, and an apparatus are provided. The apparatus may be configured to transmit, to a RU, a plurality of sets of RU configuration parameters. The apparatus may further be configured to transmit, to the RU, an indication of a first set of RU configuration parameters in the plurality of sets of RU configuration parameters for the RU to perform at least one repeating operation associated with facilitating a communication between the first UE and one of the control node or the second wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
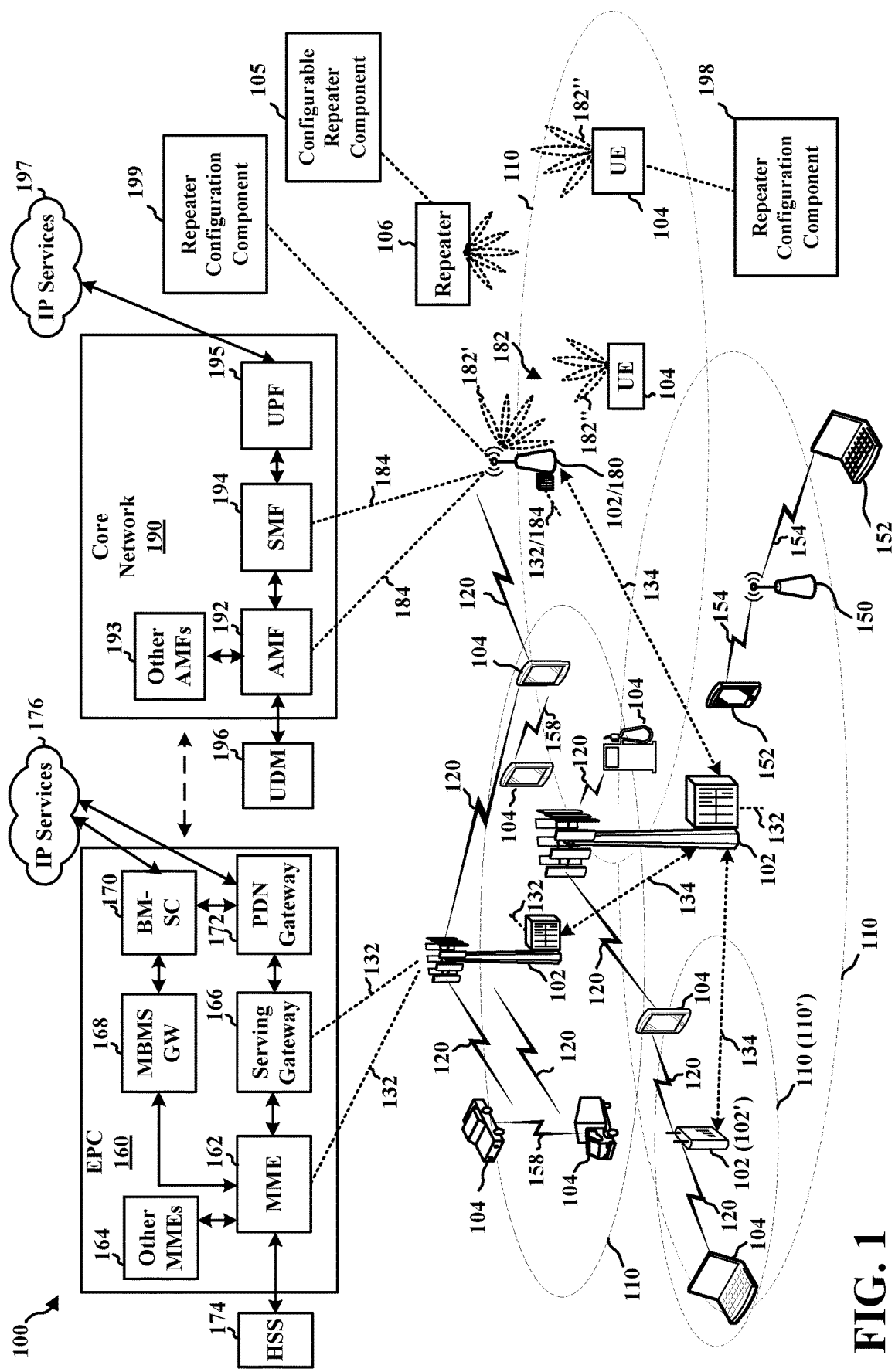
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the repeater 106 may be configured by a control node (e.g., a base station 102/180 or UE 104 including a repeater configuration component 199 or 198 respectively) to perform at least one repeating operation for a communication session between a first UE 104 and one or more of a second UE 104 or a base station 102/180. For example, the repeater 106 may include a configurable repeater component 105 configured to receive a plurality of sets of RU configuration parameters. The configurable repeater component 105 may also be configured to receive an indication of a first set of RU configuration parameters in the plurality of sets of RU configuration parameters. The configurable repeater component 105 may further be configured to perform at least one repeating operation based on the first set of RU configuration parameters, the at least one repeating operation being performed to facilitate a communication between a first wireless device and a second wireless device.

Referring again to FIG. 1, in certain aspects, the UE 104 may include a repeater configuration component 198 that may be configured to receive, from at least one of a base station, a RU, or a second UE, a plurality of sets of RU configuration parameters associated with one of a beam index, a UE index, or a parameter set index. The repeater configuration component 198 may further be configured to communicate, via a RU, with one of the second UE or the base station based on a first set of RU configuration parameters in the plurality of sets of RU configuration parameters, the RU being associated with the plurality of sets of RU configuration parameters. The repeater configuration component 198 may further be configured to transmit, to a RU, a plurality of sets of RU configuration parameters. The repeater configuration component 198 may further be configured to transmit, to the RU, an indication of a first set of RU configuration parameters in the plurality of sets of RU configuration parameters for the RU to perform at least one repeating operation associated with facilitating a communication between the first UE and one of the control node or the second wireless device.

In certain aspects, the base station 180 may include a repeater configuration component 199 that may be configured to transmit, to a RU, a plurality of sets of RU configuration parameters. The repeater configuration component 199 may further be configured to transmit, to the RU, an indication of a first set of RU configuration parameters in the plurality of sets of RU configuration parameters for the RU to perform at least one repeating operation associated with facilitating a communication between the first UE and one of the control node or the second wireless device. Although the following description may be focused on 5G NR, the concepts described herein may be applicable to other similar areas, such as LTE, LTE-A, CDMA, GSM, and other wireless technologies.

Figures 2A, 2B, 2C, 2D:
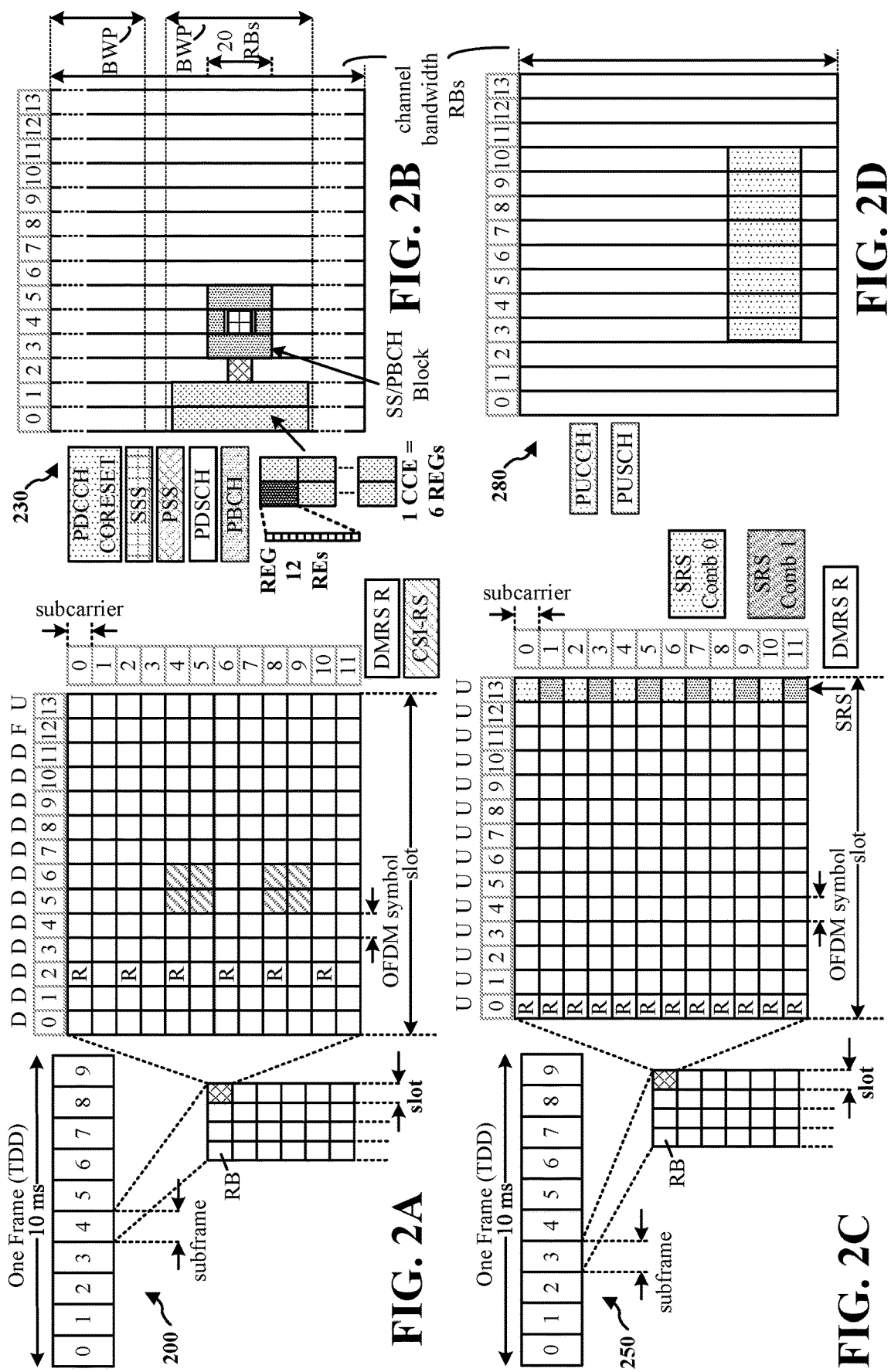
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe.

The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
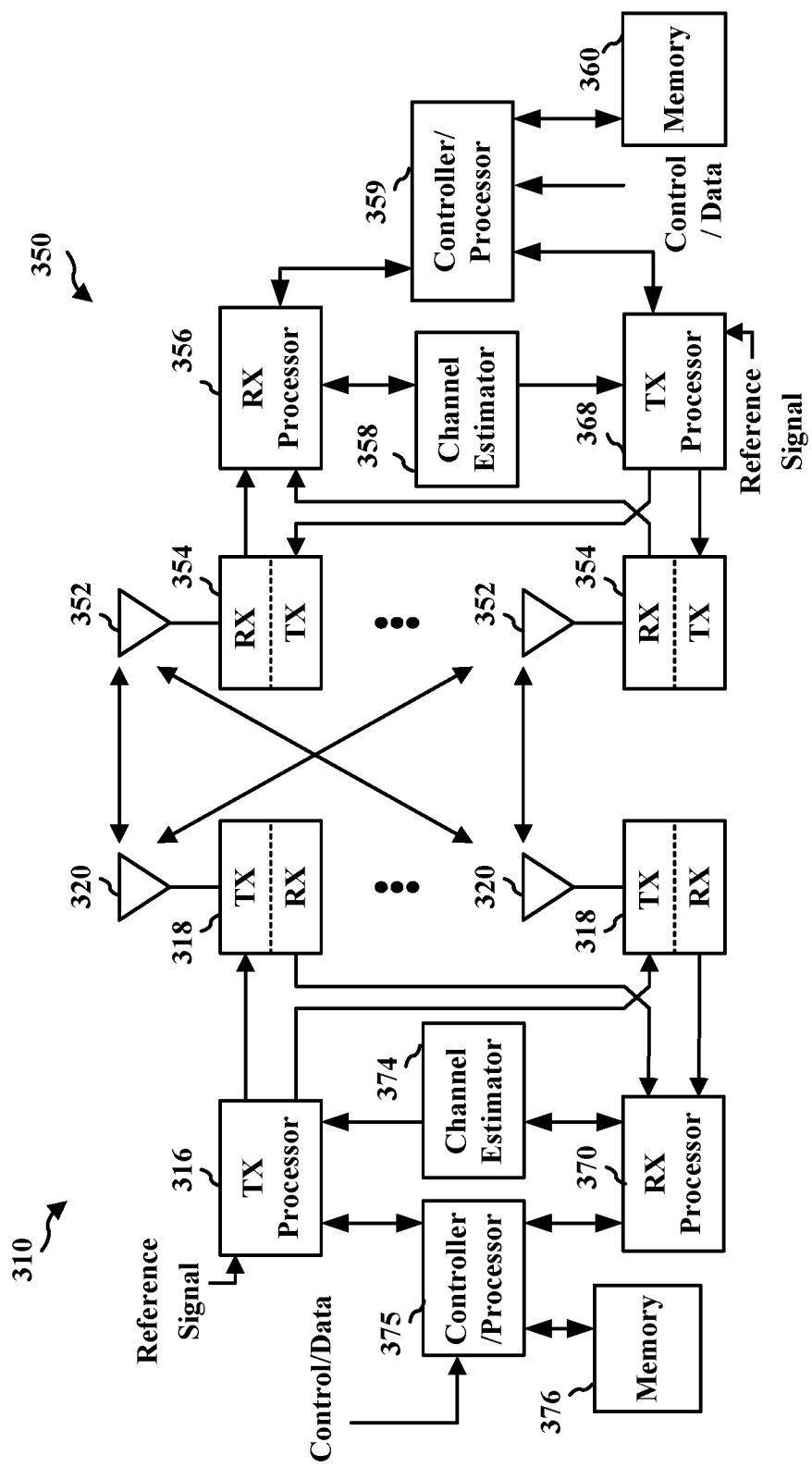
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter at RX/TX 318. Each transmitter at RX/TX 318 may modulate a radio frequency (RF) carrier with a respective spatial stream for transmission.

At the UE 350, each receiver at RX/TX 354 receives a signal through its respective antenna 352. Each receiver at RX/TX 354 recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters at RX/TX 354. Each transmitter at RX/TX 354 may modulate an RF carrier with a respective spatial stream for transmission.

The UL transmission is processed at the base station 310 in a manner similar to that described in connection with the receiver function at the UE 350. Each receiver at RX/TX 318 receives a signal through its respective antenna 320. Each receiver at RX/TX 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In wireless communications, repeaters may be used to extend network coverage. A repeater may include a repeating unit for amplification and forwarding operations between two wireless nodes, such as between a base station and a UE. Repeaters may be a simple and cost-effective manner to improve network coverage. Some repeaters, such as IAB-nodes, may operate as a decode-and-forward relay node where minimal processing on the incoming signal is performed and the incoming signal is amplified and forwarded. Repeaters may be used to extend coverage and to overcome physical blockage of signals in many cases.

Aspects presented herein provide a configurable repeater (e.g., a network-controlled repeater) including a mobile terminal for receiving control information from a control node and a repeater unit. The configurable repeater may provide further improvements beyond those provided by a non-configurable repeater that merely amplifies a received signal, by providing for control of the amplified signal.

Figure 4:
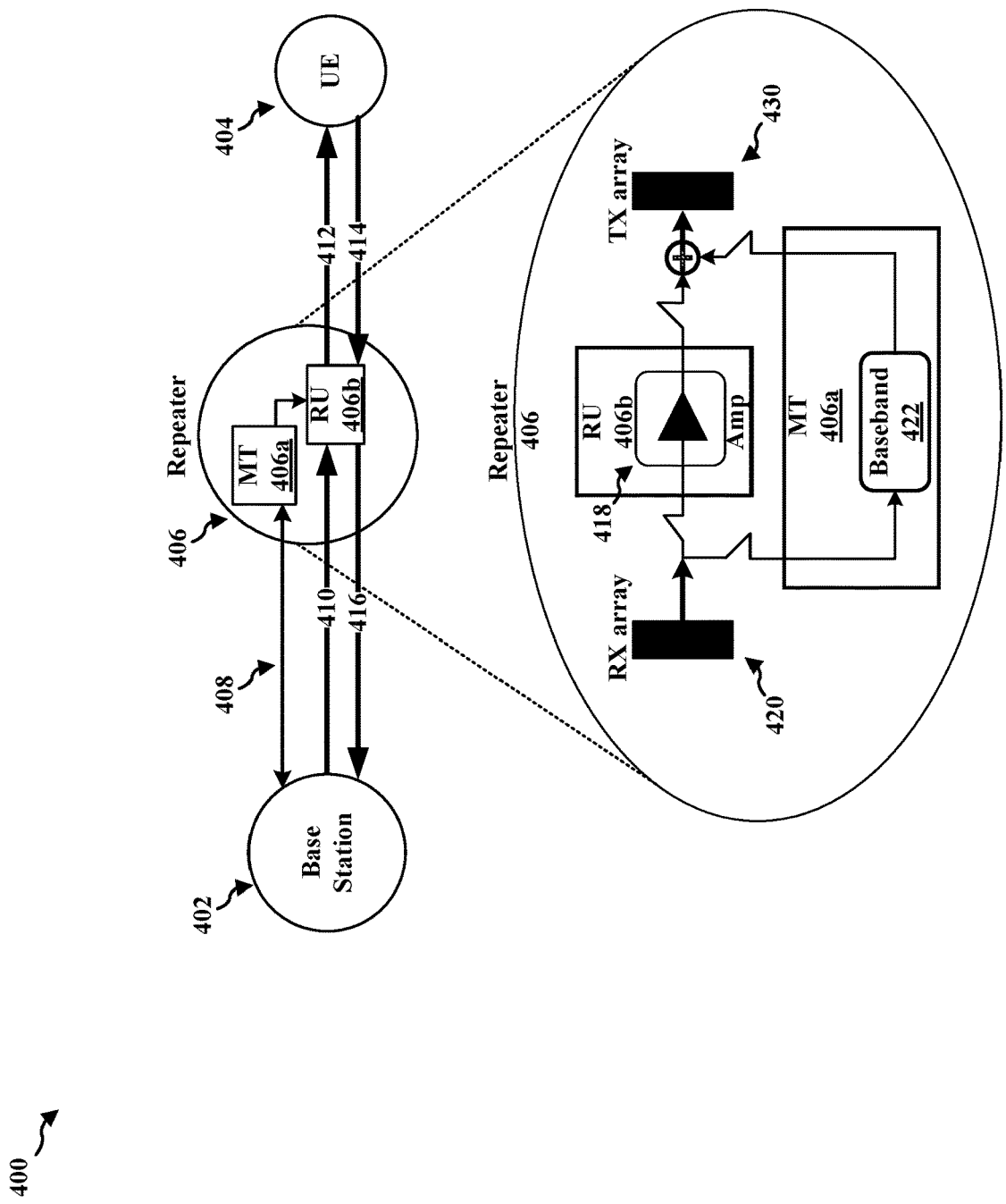
FIG. 4 is a diagram illustrating components of a configurable repeater in communication with a base station and a UE, in accordance with various aspects of the present disclosure.

FIG. 4 is a diagram 400 illustrating components of a configurable repeater 406 in communication with a base station 402 and a UE 404. Diagram 400 illustrates that the configurable repeater 406 may include a mobile terminal (MT) 406a and a repeater unit (RU) 406b. The MT 406a, in some aspects, may be a UE with a simplified interface (e.g., a simplified UE-UTRAN (Uu) interface) for receiving and/or transmitting communications 408 relating to a configuration of the RU 406b. In some aspects, the MT 406a may be configured to use a limited bandwidth part (BWP), e.g., one component carrier. The limited BWP may be configurable with a known (preconfigured or default) BWP used in the absence of a contrary configuration. The MT 406a, in some aspects, may include a baseband processor 422 that is configured to process transmissions from the base station 402. The MT 406a may be configured to transmit, to one or more of the base station 402 and the UE 404, an indication of the capabilities of the repeater, e.g., the capabilities of the MT 406a and the RU 406b.

The RU 406b may receive configuration information and/or a configuration indication from the MT 406a. Based on the received configuration information and/or the received configuration indication, the RU may configure an amplifier 418, an Rx array 420 and/or a Tx array 430 to facilitate communication between the base station 402 and the UE 404. The configuration may indicate beamforming configurations for transmission and reception, a transmission power configuration, an on-off schedule, or a time-domain resource allocation. After being configured by the base station 402, the repeater 406, and specifically RU 406b, may receive communication 410 from the base station 402 and transmit corresponding communication 412 to the UE 404. Similarly, the repeater 406, and specifically RU 406b, may receive communication 414 from the UE 404 and transmit corresponding communication 416 to the base station 402.

Figure 5:
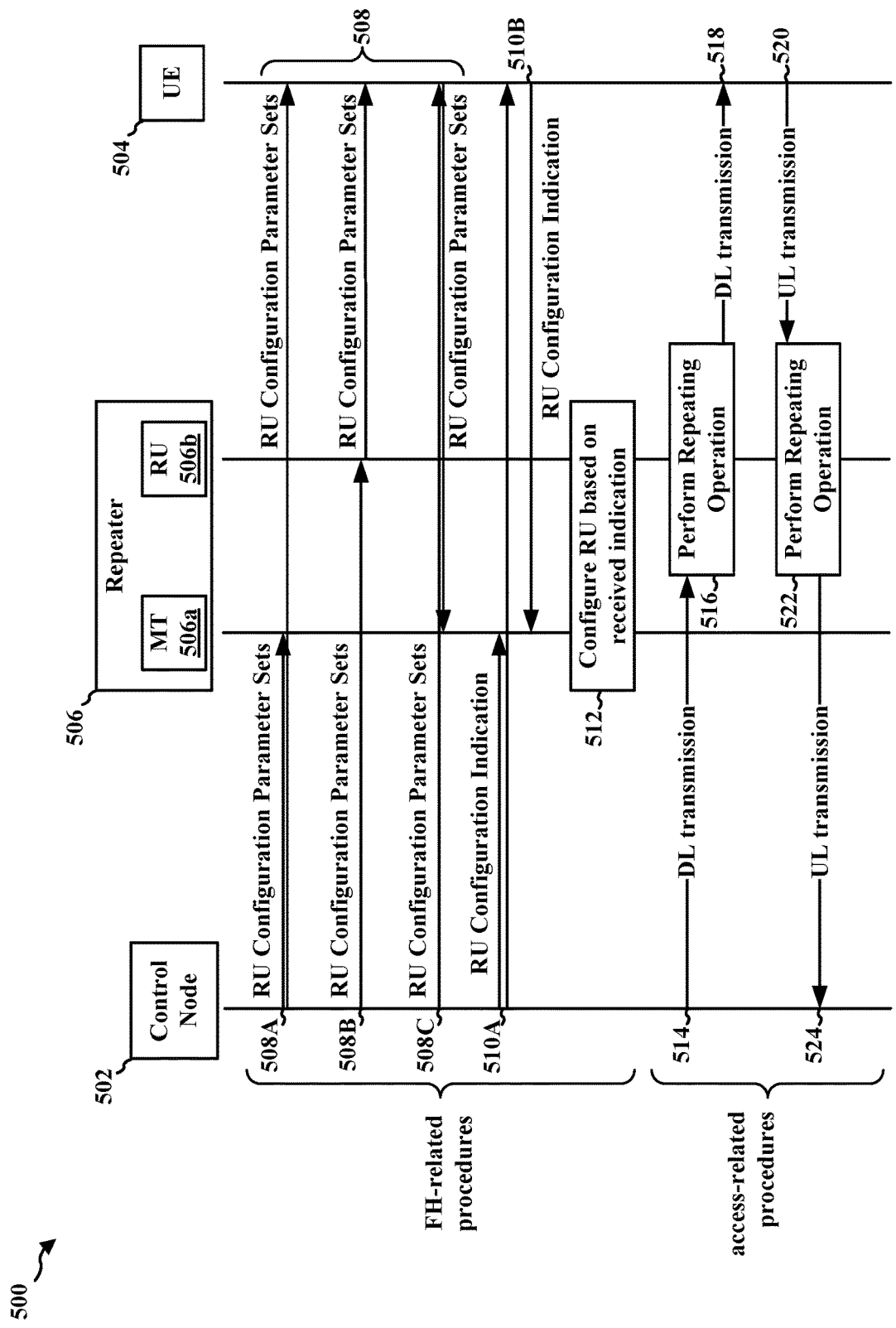
FIG. 5 is a call flow diagram illustrating wireless communication between a control node (e.g., a base station or a UE) and a UE via a repeater, in accordance with various aspects of the present disclosure.

FIG. 5 is a call flow diagram 500 illustrating wireless communication between a control node 502 (e.g., a base station or a UE) and a UE 504 via a repeater 506. The repeater 506 may include an MT 506a and a RU as described in relation to FIG. 4. The base station may transmit, and the MT 506a and UE 504 may receive, RU configuration parameter sets 508A. In some aspects, the control node 502 may transmit RU configuration parameter sets 508B to the repeater 506 (e.g., the RU 506b) and the repeater 506 may retransmit the RU configuration parameter sets 508B to the UE 504. In some aspects, the control node 502 may transmit RU configuration parameter sets 508C to the UE 504 and the UE 504 may retransmit the RU configuration parameter sets 508C to the repeater 506 (e.g., the MT 506a).

The RU configuration parameter sets 508, in some aspects, include parameter sets indicating one or more of beamforming configurations for transmission and reception, a transmission power configuration (e.g., in terms of DL and/or UL transmission power, an absolute/maximum/minimum power, or an absolute/maximum/minimum amplification gain), an on-off schedule, or a time-domain resource allocation. The parameter sets included in the RU configuration parameter sets 508, in some aspects, may additionally, or alternatively, indicate one or more of: a bandwidth (passband) configuration; whether the repeater is used for both UL communication and DL communication, for UL communication, or for DL communication with a particular UE; timing references associated with repeating/forwarding incoming signals associated with different UEs (e.g., to compensate for the UE being at different distances from the repeater 506).

The RU configuration parameter sets 508 may be one of cell-specific configuration parameter sets, group-specific configuration parameter sets, or repeater-specific configuration parameter sets. Accordingly, the RU configuration parameter sets 508 may be transmitted by the control node 502 via one of broadcast signaling, group-common signaling, or dedicated signaling, respectively. The RU configuration parameter sets 508, in some aspects, may be transmitted via an RRC message or a MAC-CE associated with semi-static signaling or a DCI associated with dynamic signaling. The RU configuration parameter sets 508, in some aspects, may be one of beam-specific, UE-specific, or an indexed set of parameters. A UE-specific RU configuration parameter set may be associated with one of a radio network temporary identifier (RNTI) associated with a UE and extracted by the RU from a PDCCH transmission or a local UE index value that is configured for identifying UEs at the RU. The local UE index value may be an identifier of UEs (e.g., using fewer bits than a RNTI) in the vicinity of the repeater 506 known to, or assigned by, the repeater 506.

Based on the RU configuration parameter sets 508, the control node 502 may transmit, and the MT 506a and/or the UE 504 may receive, an RU configuration indication 510A. In some aspects, a UE 504 may transmit, and an MT 506a may receive, an RU configuration indication 510B. The RU configuration indication 510A or 510B may indicate a RU configuration parameter set in the RU configuration parameter sets 508. The RU configuration indication 510A may be received via DCI or SCI and the RU configuration indication 510B may be received via UCI or SCI. Based on the RU configuration indication 510A and/or 510B, the repeater 506 may configure 512 the RU 506b to perform a repeating operation for communication between the control node 502 and the UE 504. The RU 506b may be configured with separate beam configurations for transmissions to or from the control node 502 and for transmissions to or from the UE 504. Each beam configuration may be associated with different parameters as described above. In some aspects, the RU configuration indication 510A transmitted by the control node 502 may configure the beam configurations at the repeater 506 for the reception from, and transmission to, both the control node 502 and the UE 504 such that the UE may not be aware of the repeater 506.

The control node 502 may transmit, and the RU 506b may receive, DL transmission 514. The RU 506b may perform a repeating operation 516 and transmit DL transmission 518. The DL transmission 514 may include DCI relevant to repeater 506, and the repeater 506 may extract the relevant information from the received DL transmission 514. The UE 504 may transmit, and the RU 506b may receive, UL transmission 520. The RU 506b may perform a repeating operation 522 and transmit UL transmission 524. The UL transmission 520 may include UCI relevant to repeater 506, and the repeater 506 may extract the relevant information from the received DL transmission 514.

Figure 6:
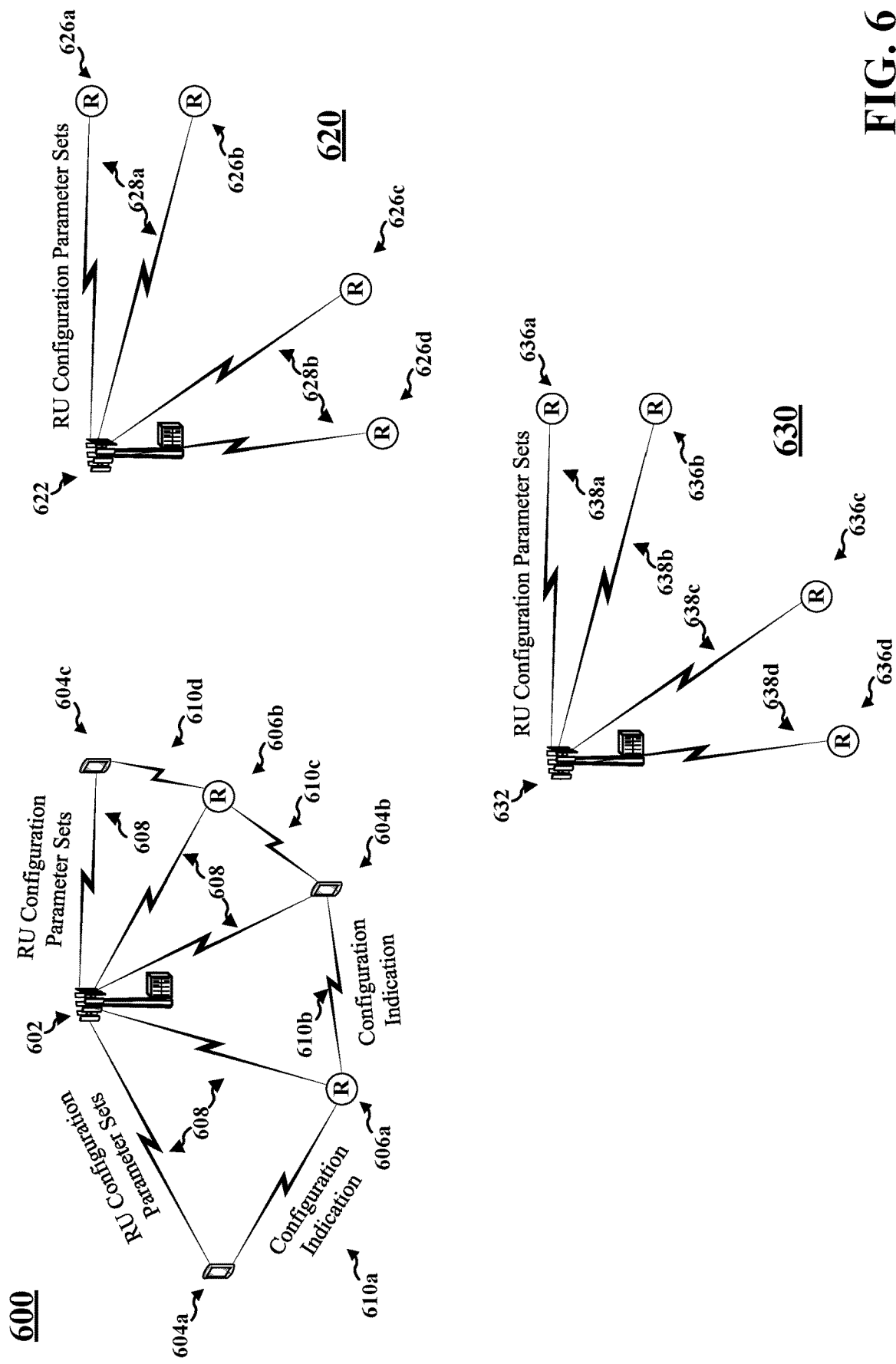
FIG. 6 is a set of diagrams illustrating networks using cell-specific, group-specific, and repeater-specific configuration parameter sets, in accordance with various aspects of the present disclosure.

FIG. 6 is a set of diagrams 600, 620, and 630 illustrating networks using cell-specific, group-specific, and repeater-specific configuration parameter sets. Diagram 600 illustrates that the base station 602 may transmit a cell-specific RU configuration parameter set 608 to each of the UEs 604a-c and the repeaters 606a-b. The RU configuration parameter sets 608 may include the parameters described in relation to RU configuration parameter sets 508. Based on the RU configuration parameter sets 608, the UE 604a may transmit a configuration indication 610a to the repeater 606a indicating a first RU configuration parameter set in the RU configuration parameter sets 608 for a communication with UE 604b. The UE 604b may also transmit a configuration indication 610b to the repeater 606a indicating a second RU configuration parameter set in the RU configuration parameter sets 608 for the communication with the UE 604a. The configuration indication 610a and the configuration indication 610b may be similar to RU configuration indication 510B transmitted by the UE 504 of FIG. 5. Similarly, the UE 604b may transmit a configuration indication 610c to the repeater 606b indicating a third RU configuration parameter set in the RU configuration parameter sets 608 for a communication with UE 604c. The UE 604c may also transmit a configuration indication 610d to the repeater 606b indicating a fourth RU configuration parameter set in the RU configuration parameter sets 608 for the communication with the UE 604b.

Diagram 620 illustrates the base station 622 may transmit a first group-specific RU configuration parameter sets 628a to a group of repeaters including repeater 626a and 626b. Diagram 620 further illustrates that the base station 622 may transmit a second group-specific RU configuration parameter sets 628b to a group of repeaters including repeater 626c and 626d. Diagram 630 illustrates the base station 632 may transmit different repeater-specific RU configuration parameter sets 638a, 638b, 638c, and 638d to different repeaters 636a, 636b, 636c, and 636d.

Figure 7:
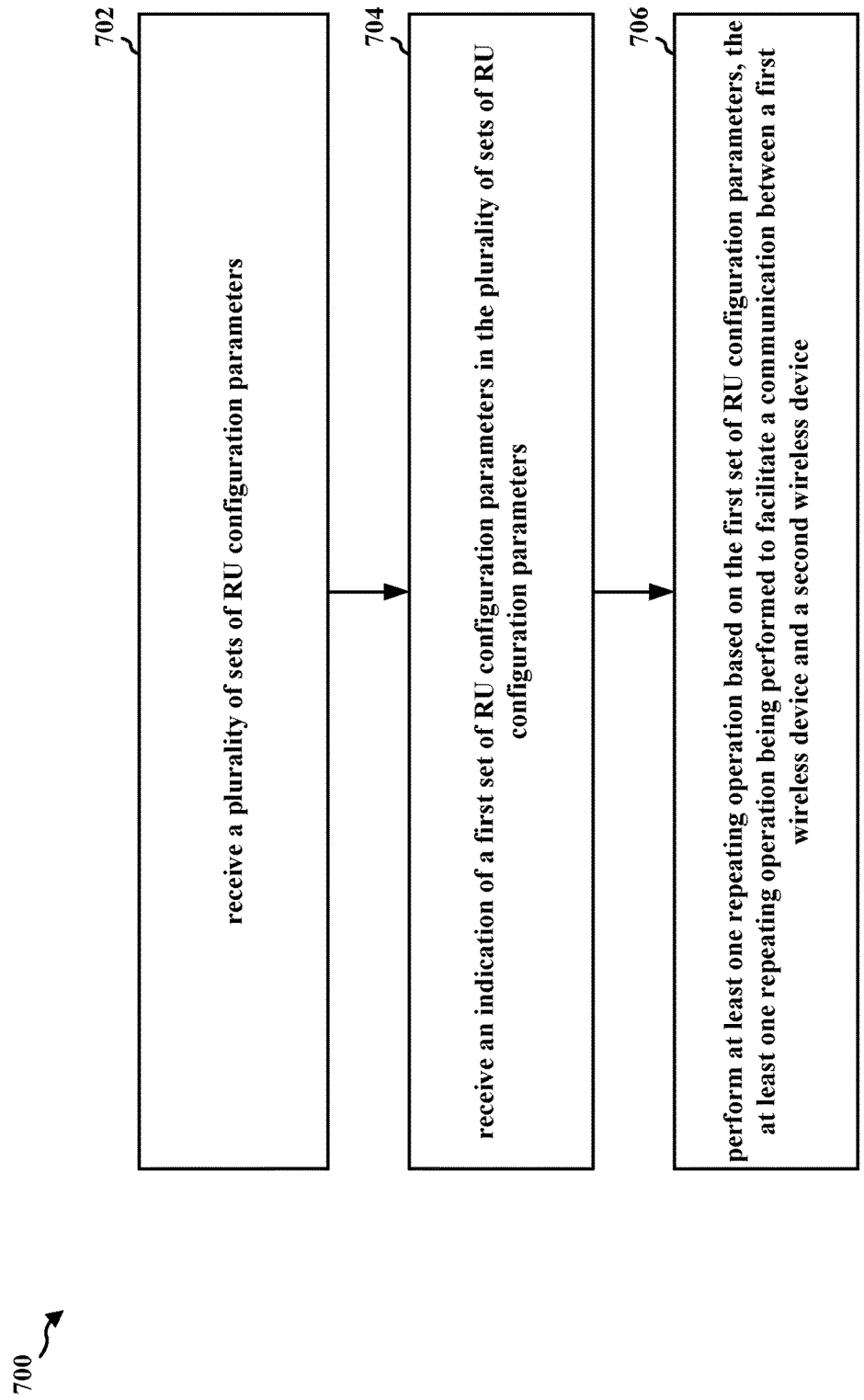
FIG. 7 is a flowchart of a method of wireless communication.

FIG. 7 is a flowchart 700 of a method of wireless communication. The method may be performed by a repeater (e.g., the repeater 106, 406, 506, 606a, and 606b; the apparatus 1402). At 702, the repeater may receive a plurality of sets of RU configuration parameters. For example, 702 may be performed by configuration parameter set reception component 1440. The repeater may facilitate communication between a first wireless device and a second wireless device. In some aspects, the first wireless device is a base station and the second wireless device is a UE, and the plurality of sets of RU configuration parameters may be received from the first wireless device. The first wireless device, in some aspects, may be a first UE and the second wireless device may be a second UE, and the plurality of sets of RU configuration parameters may be received from one of the first UE or a base station. For example, referring to FIGS. 4-6, a repeater 406, 506, 606a, or 606b, may receive a plurality of sets of RU configuration parameter sets 508 or 608 via the simplified interface for receiving and/or transmitting communications 408.

Each set of RU configuration parameters, in some aspects, may include a beamforming configuration and a time-domain resource allocation associated with the beamforming configuration. In some aspects, each set of RU configuration parameters includes one or more of a transmission power configuration, an operating bandwidth, an On-Off schedule indicating times at which the RU may be inactive, a directionality indication that indicates the set of RU configuration parameters applies to one or more of a downlink transmission or an uplink transmission or a sidelink transmission, a timing reference indication that indicates one or more timing parameters associated with repeating transmissions received at the RU. The plurality of sets of RU configuration parameters may be one of a plurality of sets of repeater-specific configuration parameters, a plurality of sets of cell-specific configuration parameters, or a plurality of repeater-group configuration parameters.

In some aspects, the plurality of sets of configuration parameters may be received via one of an RRC message or a MAC-CE. Each set of RU configuration parameters in the plurality of sets of RU configuration parameters, in some aspects, may be associated with a beam index. In some aspects, each set of RU configuration parameters in the plurality of sets of RU configuration parameters is associated with a parameter set index. Each set of RU configuration parameters in the plurality of sets of RU configuration parameters, in some aspects, may be associated with a UE index. The UE index value, in some aspects, may be one of a RNTI associated with the UE or a local UE index value that identifies the first UE at the repeater.

At 704, the repeater may receive an indication of a first set of RU configuration parameters in the plurality of sets of RU configuration parameters. For example, 704 may be performed by configuration indication reception component 1442. In some aspects, the first wireless device is a base station and the second wireless device is a UE and the indication of the first set of RU configuration parameters is received from one of the first wireless device or the second wireless device. The first wireless device, in some aspects, may be a first UE and the second wireless device is a second UE and the indication of the first set of RU configuration parameters is received from one of the first UE, the second UE or the base station. The indication of the first set of RU configuration parameters is received via one of DCI, UCI, or SCI.

In some aspects, the indication of the first set of RU configuration parameters includes a beam index value associated with the first set of RU configuration parameters. The indication of the first set of RU configuration parameters, in some aspects, includes a parameter set index value associated with the first set of RU configuration parameters. The indication, in some aspects, includes a UE index value associated with the first set of RU configuration parameters, the UE index value may be one of a RNTI associated with a UE and extracted by the RU from a PDCCH transmission or a local UE index value that is configured for identifying UEs at the repeater. For example, referring to FIGS. 5 and 6, the repeaters 506, 606a, or 606b may receive the RU configuration indication 510A or 510B or configuration indication 610a, 610b, 610c, or 610d.

Finally, at 706, the repeater may perform at least one repeating operation based on the first set of RU configuration parameters. In some aspects, the at least one repeating operation may be performed to facilitate a communication between the first wireless device and the second wireless device. For example, 706 may be performed by repeating component 1444. For example, referring to FIG. 5, the repeater 506 may perform repeating operations 516 and 522 for repeating DL transmission 514 and UL transmission 520, respectively.

Figure 8:
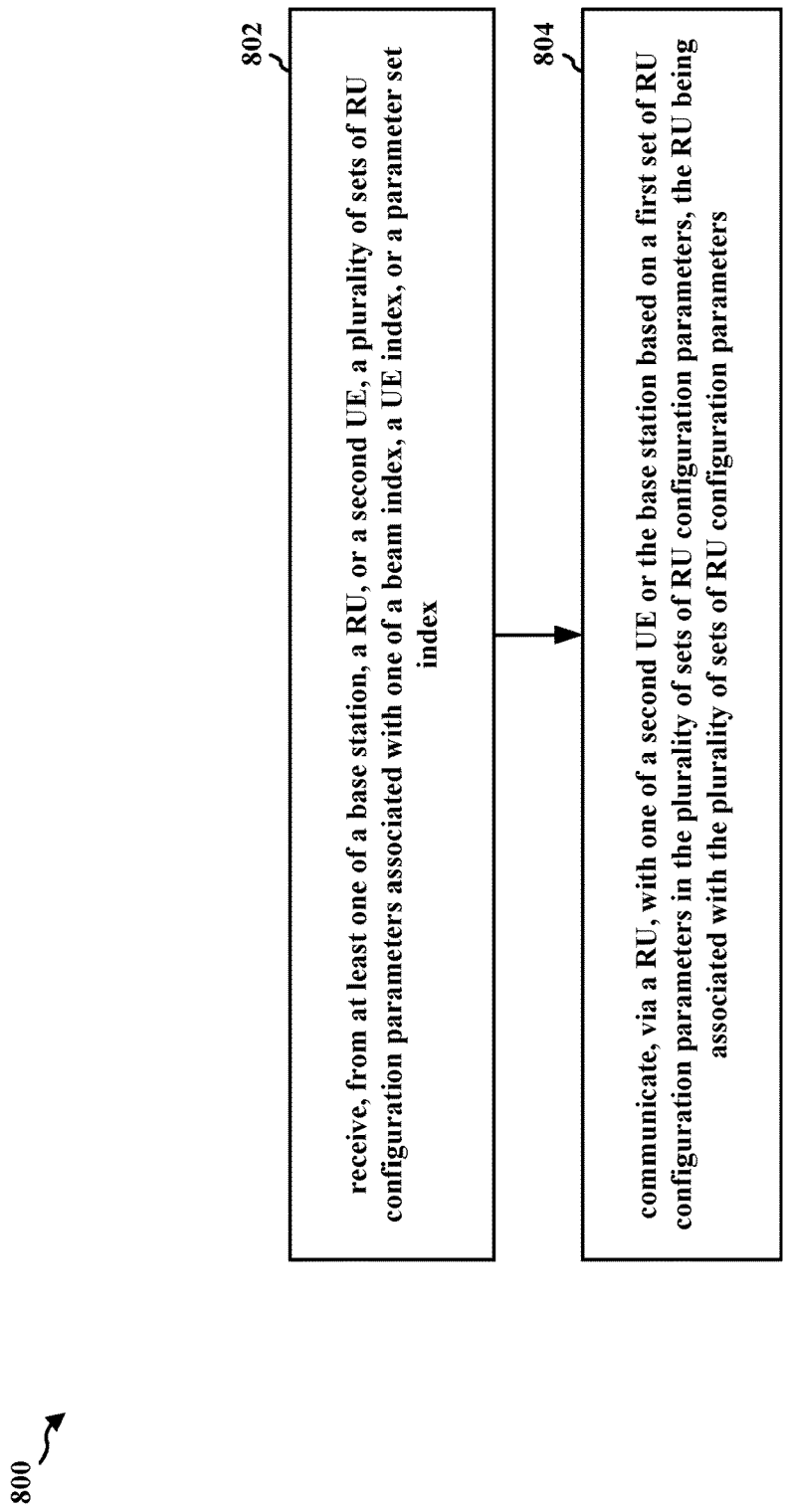
FIG. 8 is a flowchart of a method of wireless communication.

FIG. 8 is a flowchart 800 of a method of wireless communication. The method may be performed by a UE (e.g., the UE 104, 404, 504, 604a, 604b, and 604c; the apparatus 1202). At 802, the UE may receive, from at least one of a base station, a RU, or a second UE, a plurality of sets of RU configuration parameters associated with one of a beam index, a UE index, or a parameter set index. For example, 802 may be performed by configuration parameter set component 1240. Each set of RU configuration parameters in the plurality of sets of RU configuration parameters, in some aspects, may be associated with the beam index. In some aspects, each set of RU configuration parameters in the plurality of sets of RU configuration parameters may be associated with the parameter set index. Each set of RU configuration parameters in the plurality of sets of RU configuration parameters, in some aspects, may be associated with the UE index. For example, referring to FIG. 5, the UE 504 may receive RU configuration parameter sets 508A from the base station or may receive the RU configuration parameter sets 508B from the RU 506b.

At 804, the UE may communicate, via a RU, with one of the second UE or the base station based on a first set of RU configuration parameters in the plurality of sets of RU configuration parameters. For example, 804 may be performed by a communication component 1244. The RU, in some aspects, may be associated with the plurality of sets of RU configuration parameters, e.g., the plurality of sets of RU configuration parameters are cell-specific, group-specific, or repeater-specific for a cell, group, or repeater including the RU. For example, referring to FIGS. 5 and 6, the UE 504, 604a, 604b, and 604c may communicate with the control node 502 or one of the UE 604a, 604b, and 604c via the repeater 506 (or more specifically RU 506b) or one of the repeaters 606a or 606b.

Figure 9:
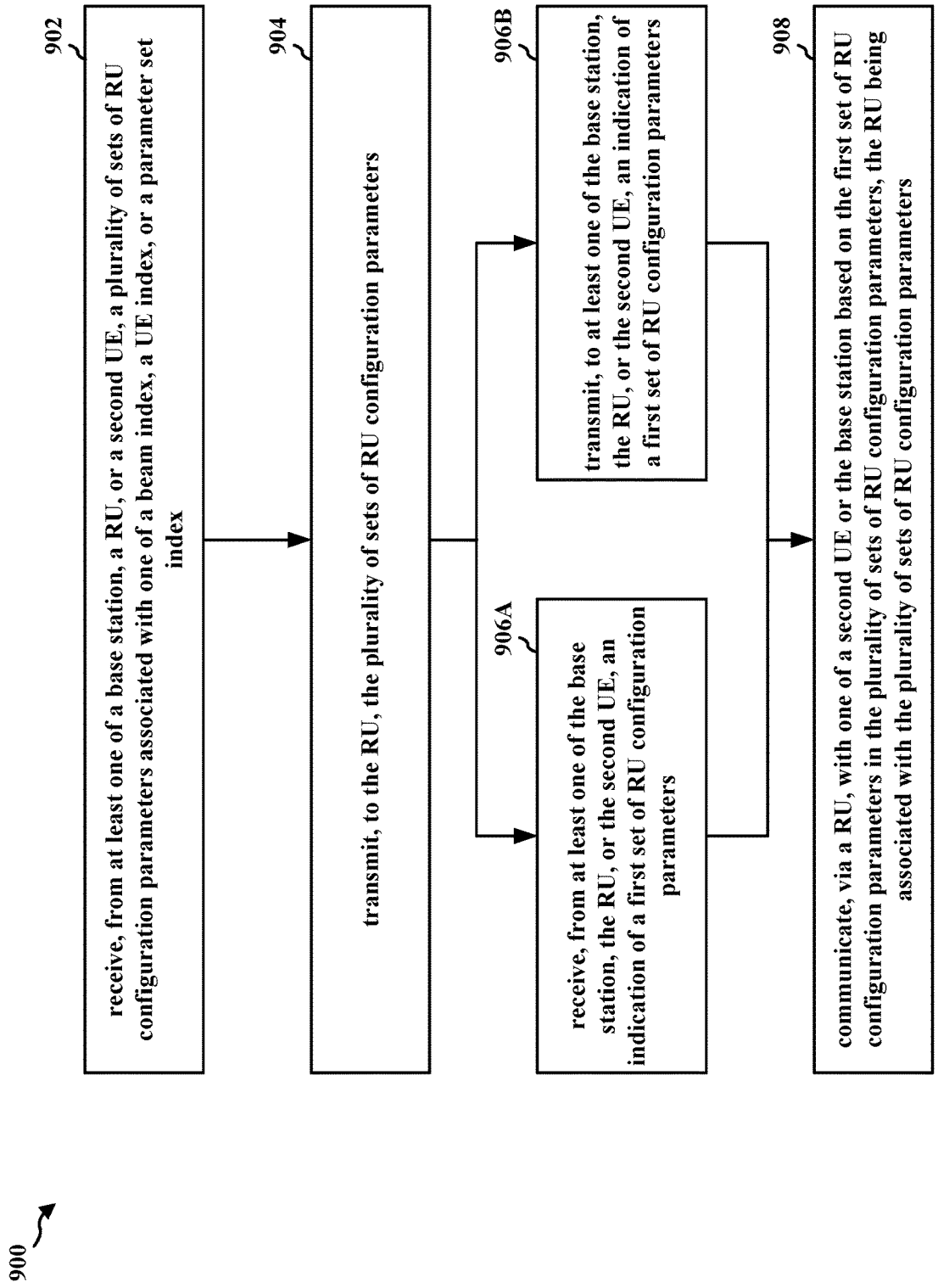
FIG. 9 is a flowchart of a method of wireless communication.

FIG. 9 is a flowchart 900 of a method of wireless communication. The method may be performed by a UE (e.g., the UE 104, 404, 504, 604a, 604b, and 604c; the apparatus 1202). At 902, the UE may receive, from at least one of a base station, a RU, or a second UE, a plurality of sets of RU configuration parameters associated with one of a beam index, a UE index, or a parameter set index. For example, 902 may be performed by configuration parameter set component 1240. Each set of RU configuration parameters in the plurality of sets of RU configuration parameters, in some aspects, may be associated with the beam index. In some aspects, each set of RU configuration parameters in the plurality of sets of RU configuration parameters may be associated with the parameter set index. Each set of RU configuration parameters in the plurality of sets of RU configuration parameters, in some aspects, may be associated with the UE index. For example, referring to FIG. 5, the UE 504 may receive RU configuration parameter sets 508A from the base station or may receive the RU configuration parameter sets 508B from the RU 506b.

At 904, the UE may transmit, to the RU, the plurality of sets of RU configuration parameters. For example, 904 may be performed by configuration parameter set component 1240. Each set of RU configuration parameters, in some aspects, includes a beamforming configuration and a time-domain resource allocation associated with the beamforming configuration. In some aspects, each set of RU configuration parameters includes one or more of a transmission power configuration, an operating bandwidth, an On-Off schedule indicating times at which the RU may be inactive, a directionality indication that indicates the set of RU configuration parameters applies to one or more of a downlink transmission or an uplink transmission or a sidelink transmission, a timing reference indication that indicates one or more timing parameters associated with repeating transmissions received at the RU. For example, referring to FIG. 5, the UE 504 may transmit the RU configuration parameter sets 508C to the repeater 506 (e.g., the MT 506a).

At 906A, the UE may receive, from at least one of the base station, the RU, or the second UE, an indication of the first set of RU configuration parameters. At 906B, the UE may transmit, to the RU, an indication of the first set of RU configuration parameters. For example, 906A or 906B may be performed by configuration indication component 1242. The indication of the first set of RU configuration parameters, in some aspects, may include a beam index value associated with the first set of RU configuration parameters. In some aspects, the indication of the first set of RU configuration parameters includes a parameter set index value associated with the first set of RU configuration parameters. The indication of the first set of RU configuration parameters, in some aspects, includes a UE index value associated with the first set of RU configuration parameters, the UE index value may be one of a RNTI associated with the UE or a local UE index value that identifies the first UE at the RU. The indication of the first set of RU configuration parameters is transmitted via SCI. For example, referring to FIGS. 5 and 6, the UE 504, 604a, 604b, and 604c may receive RU configuration indication 510A or may transmit RU configuration indication 510B or configuration indication 610a, 610b, 610c, or 610d.

Finally, at 908, the UE may communicate, via a RU, with one of the second UE or the base station based on a first set of RU configuration parameters in the plurality of sets of RU configuration parameters. For example, 908 may be performed by a communication component 1244. The RU, in some aspects, may be associated with the plurality of sets of RU configuration parameters, e.g., the plurality of sets of RU configuration parameters are cell-specific, group-specific, or repeater-specific for a cell, group, or repeater including the RU. For example, referring to FIGS. 5 and 6, the UE 504, 604a, 604b, and 604c may communicate with the control node 502 or one of the UE 604a, 604b, and 604c via the repeater 506 (or more specifically RU 506b) or one of the repeaters 606a or 606b.

Figure 10:
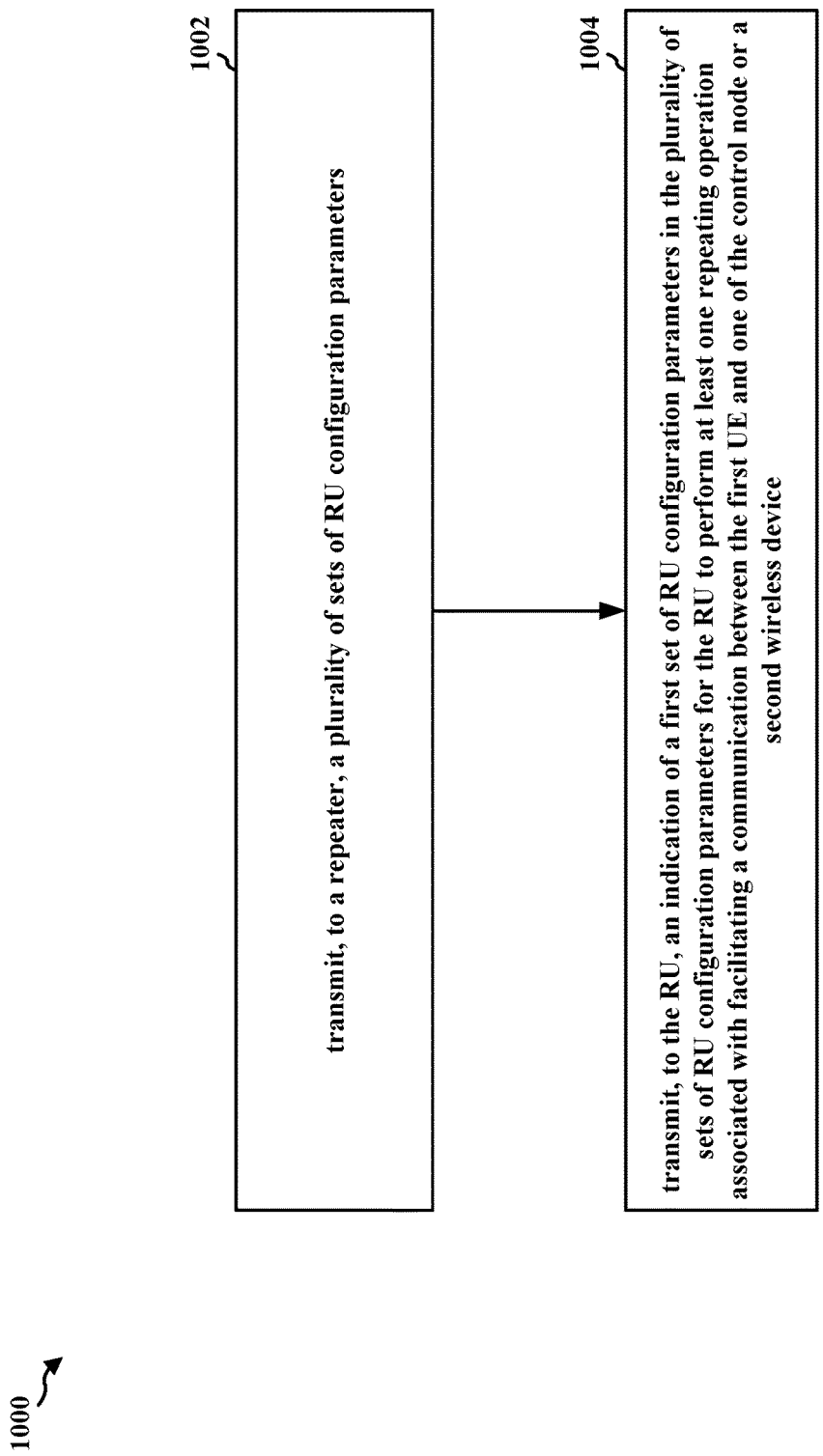
FIG. 10 is a flowchart of a method of wireless communication.

FIG. 10 is a flowchart 1000 of a method of wireless communication. The method may be performed by a control node (e.g., the UE 104, 404, 504, 604a, 604b, and 604c; the apparatus 1202; the base station 102, 402, and 602; the control node 502; the apparatus 1302). At 1002, the control node may transmit, to a RU, a plurality of sets of RU configuration parameters. For example, 1002 may be performed by configuration parameter set component 1240 or by configuration parameter set component 1340. In some aspects, each set of RU configuration parameters includes a beamforming configuration and a time-domain resource allocation associated with the beamforming configuration. Each set of RU configuration parameters, in some aspects, may include one or more of a transmission power configuration, an operating bandwidth, an On-Off schedule indicating times at which the RU may be inactive, a directionality indication that indicates the set of RU configuration parameters applies to one or more of a downlink transmission or an uplink transmission, a timing reference indication that indicates one or more timing parameters associated with repeating transmissions received at the RU. For example, referring to FIGS. 5 and 6, the control node 502 or the base station 602, 622, or 632 may transmit RU configuration parameter sets 508A, 508B, 608, 628a, 628b, or 638a-638d.

The plurality of sets of RU configuration parameters, in some aspects, may be transmitted via one of a RRC message or a MAC-CE. In some aspects, each set of RU configuration parameters in the plurality of sets of RU configuration parameters may be associated with a beam index. Each set of RU configuration parameters in the plurality of sets of RU configuration parameters, in some aspects, may be associated with a parameter set index. In some aspects, each set of RU configuration parameters in the plurality of sets of RU configuration parameters may be associated with a UE index. In some aspect, the control node may transmit the plurality of sets of RU configuration parameters to a plurality of RUs in a same cell as the control node, where the sets of RU configuration parameters are sets of cell-specific RU configurations. The control node, in some aspects, may transmit the plurality of sets of RU configuration parameters to a plurality of RUs in a same repeater group, where the sets of RU configuration parameters are sets of group-specific RU configurations.

At 1004, the control node may transmit, to the RU, an indication of a first set of RU configuration parameters in the plurality of sets of RU configuration parameters for the RU to perform at least one repeating operation associated with facilitating a communication between the first UE and one of the control node or a second wireless device. For example, 1004 may be performed by configuration indication component 1242 or by configuration indication component 1342. The indication of the first set of RU configuration parameters, in some aspects, includes a beam index value associated with the first set of RU configuration parameters. In some aspects, the indication of the first set of RU configuration parameters may include a parameter set index value associated with the first set of RU configuration parameters. The indication of the first set of RU configuration parameters, in some aspects, may include a UE index value associated with the first set of RU configuration parameters, the UE index value being one of a RNTI associated with the first UE and extracted by the RU from a PDCCH transmission or a local UE index value that identifies the first UE at the RU. The indication of the first set of RU configuration parameters is transmitted via one of DCI or SCI. For example, referring to FIG. 5, the control node 502 may transmit RU configuration indication 510A to repeater 506 (e.g., MT 506a). The control node may receive, from the RU, a transmission associated with a UE based on the configuration indication transmitted at 1004.

Figure 11:
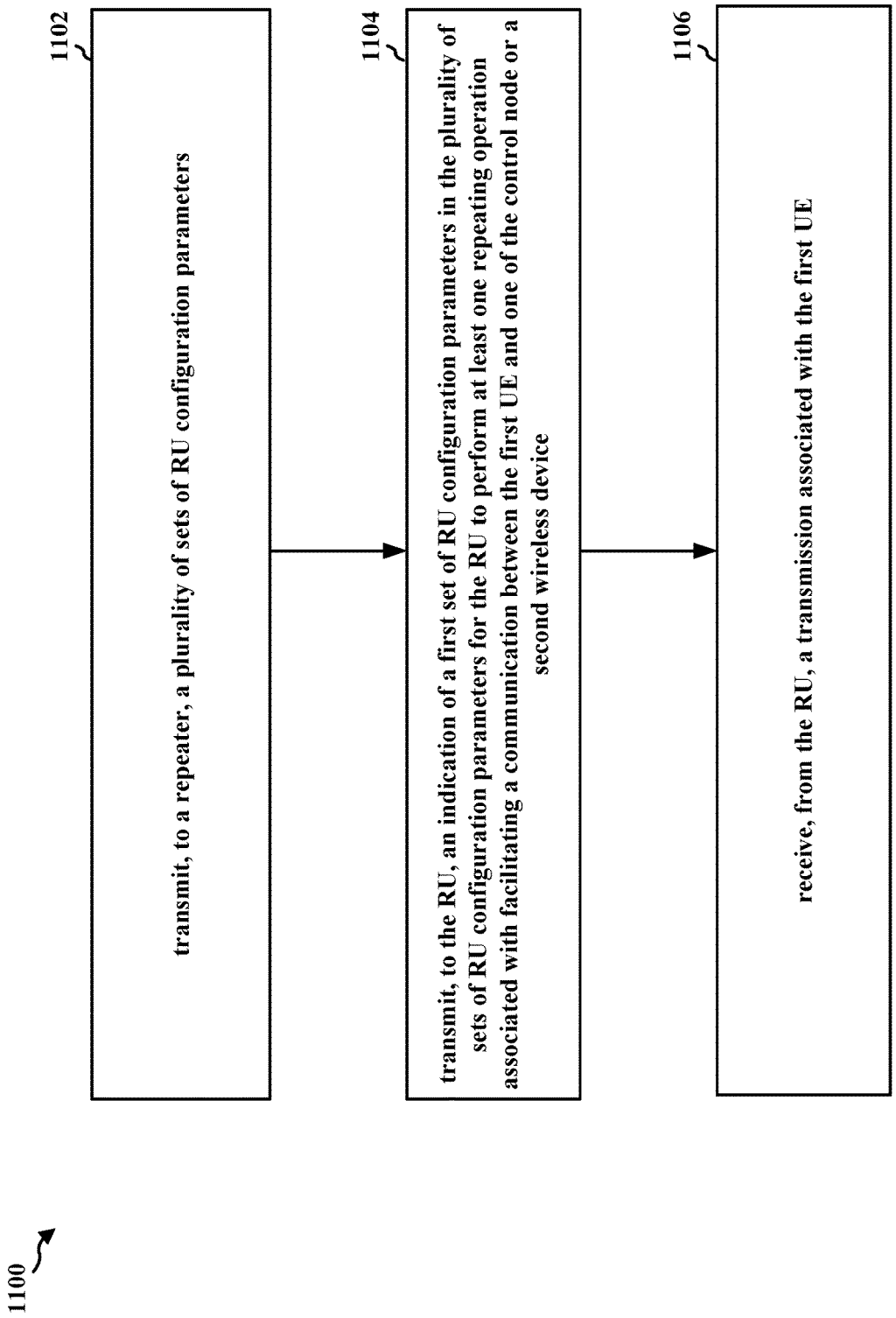
FIG. 11 is a flowchart of a method of wireless communication.

FIG. 11 is a flowchart 1100 of a method of wireless communication. The method may be performed by a control node (e.g., the UE 104, 404, 504, 604a, 604b, and 604c; the apparatus 1202; the base station 102, 402, and 602; the control node 502; the apparatus 1302). At 1102, the control node may transmit, to a RU, a plurality of sets of RU configuration parameters. For example, 1102 may be performed by configuration parameter set component 1240 or by configuration parameter set component 1340. In some aspects, each set of RU configuration parameters includes a beamforming configuration and a time-domain resource allocation associated with the beamforming configuration. Each set of RU configuration parameters, in some aspects, may include one or more of a transmission power configuration, an operating bandwidth, an On-Off schedule indicating times at which the RU may be inactive, a directionality indication that indicates the set of RU configuration parameters applies to one or more of a downlink transmission or an uplink transmission, a timing reference indication that indicates one or more timing parameters associated with repeating transmissions received at the RU. For example, referring to FIGS. 5 and 6, the control node 502 or the base station 602, 622, or 632 may transmit RU configuration parameter sets 508A, 508B, 608, 628a, 628b, or 638a-638d.

The plurality of sets of RU configuration parameters, in some aspects, may be transmitted via one of a RRC message or a MAC-CE. In some aspects, each set of RU configuration parameters in the plurality of sets of RU configuration parameters may be associated with a beam index. Each set of RU configuration parameters in the plurality of sets of RU configuration parameters, in some aspects, may be associated with a parameter set index. In some aspects, each set of RU configuration parameters in the plurality of sets of RU configuration parameters may be associated with a UE index. In some aspect, the control node may transmit the plurality of sets of RU configuration parameters to a plurality of RUs in a same cell as the control node, where the sets of RU configuration parameters are sets of cell-specific RU configurations. The control node, in some aspects, may transmit the plurality of sets of RU configuration parameters to a plurality of RUs in a same repeater group, where the sets of RU configuration parameters are sets of group-specific RU configurations.

At 1104, the control node may transmit, to the RU, an indication of a first set of RU configuration parameters in the plurality of sets of RU configuration parameters for the RU to perform at least one repeating operation associated with facilitating a communication between the first UE and one of the control node or a second wireless device. For example, 1104 may be performed by configuration indication component 1242 or by configuration indication component 1342. The indication of the first set of RU configuration parameters, in some aspects, includes a beam index value associated with the first set of RU configuration parameters. In some aspects, the indication of the first set of RU configuration parameters may include a parameter set index value associated with the first set of RU configuration parameters. The indication of the first set of RU configuration parameters, in some aspects, may include a UE index value associated with the first set of RU configuration parameters, the UE index value being one of a RNTI associated with the first UE and extracted by the RU from a PDCCH transmission or a local UE index value that identifies the first UE at the RU. The indication of the first set of RU configuration parameters is transmitted via one of DCI or SCI. For example, referring to FIG. 5, the control node 502 may transmit RU configuration indication 510A to repeater 506 (e.g., MT 506a).

Finally, at 1106, the control node may receive, from the RU, a transmission associated with a first UE. For example, 1106 may be performed by communication component 1244 or by communication component 1344. In some aspects, the transmission may be based on the configuration indication transmitted at 1104. For example, referring to FIG. 5, the control node 502 may receive UL transmission 524 from the RU 506b.

Figure 12:
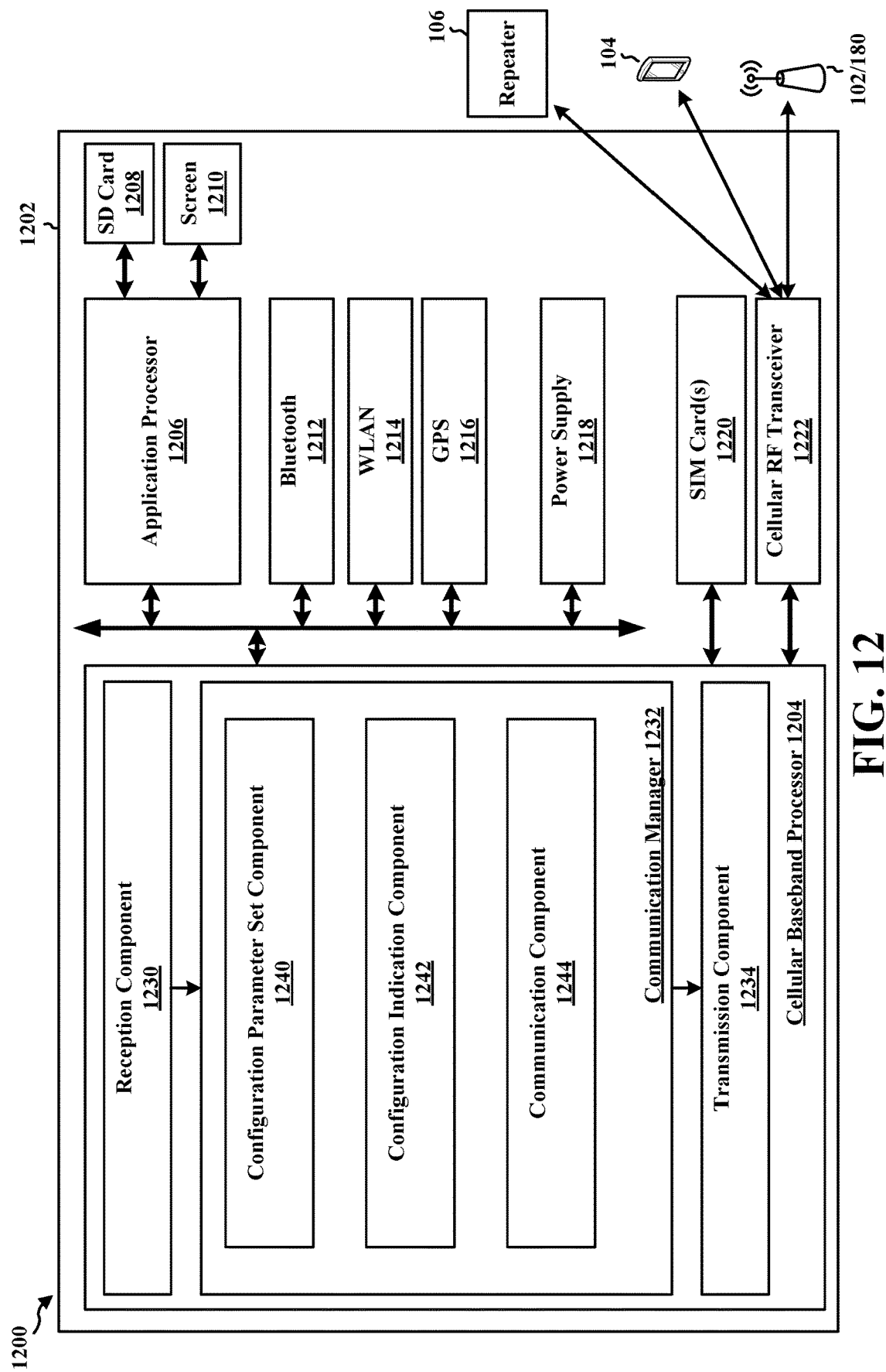
FIG. 12 is a diagram illustrating an example of a hardware implementation for an apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the cellular baseband processor 1204, and in another configuration, the apparatus 1202 may be the entire UE (e.g., see 350 of FIG. 3) and include the additional modules of the apparatus 1202.

The communication manager 1232 includes a configuration parameter set reception component 1240 that is configured to receive, from at least one of a base station, a RU, or a second UE, a plurality of sets of RU configuration parameters associated with one of a beam index, a UE index, or a parameter set index and transmit, to the RU, the plurality of sets of RU configuration parameters, e.g., as described in connection with 802, 902, 904, 1002, and 1102 of FIGS. 8-11. The communication manager 1232 further includes a configuration indication component 1242 that receives input in the form of a plurality of sets of RU configuration parameter sets from the component 1240 and is configured to receive, from at least one of the base station, the RU, or the second UE, an indication of the first set of RU configuration parameters; and transmit, to the RU, an indication of a first set of RU configuration parameters in the plurality of sets of RU configuration parameters for the RU to perform at least one repeating operation associated with facilitating a communication between the first UE and one of the control node or a second wireless device, e.g., as described in connection with 906A, 906B, 1004, and 1104 of FIGS. 9-11. The communication manager 1232 further includes a communication component 1244 that receives input in the form of a set of parameters indicated by the received configuration indication from the configuration indication component 1242 and is configured to communicate, via a RU, with one of the second UE or the base station based on a first set of RU configuration parameters in the plurality of sets of RU configuration parameters; receive, from the RU, a transmission associated with a first UE, e.g., as described in connection with 804, 908, and 1106 of FIGS. 8, 9, and 11.

The apparatus may include additional components that perform each of the blocks of the algorithm in the flowcharts of FIGS. 8-11. As such, each block in the flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from at least one of a base station, a RU, or a second UE, a plurality of sets of RU configuration parameters associated with one of a beam index, a UE index, or a parameter set index. The apparatus may further include means for communicating, via a RU, with one of the second UE or the base station based on a first set of RU configuration parameters in the plurality of sets of RU configuration parameters, the RU being associated with the plurality of sets of RU configuration parameters. The apparatus may further include means for transmitting, to at least one of the base station, the RU, or the second UE, an indication of the first set of RU configuration parameters. The apparatus may further include means for transmitting, to the RU, the plurality of sets of RU configuration parameters. The apparatus may further include means for receiving, from at least one of the base station, the RU, or the second UE, an indication of the first set of RU configuration parameters. The apparatus may further include means for transmitting, to a RU, a plurality of sets of RU configuration parameters. The apparatus may further include means for transmitting, to the RU, an indication of a first set of RU configuration parameters in the plurality of sets of RU configuration parameters for the RU to perform at least one repeating operation associated with facilitating a communication between the first UE and one of the control node or the second wireless device. The apparatus may further include means for receiving, from the RU, a transmission associated with a first UE. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
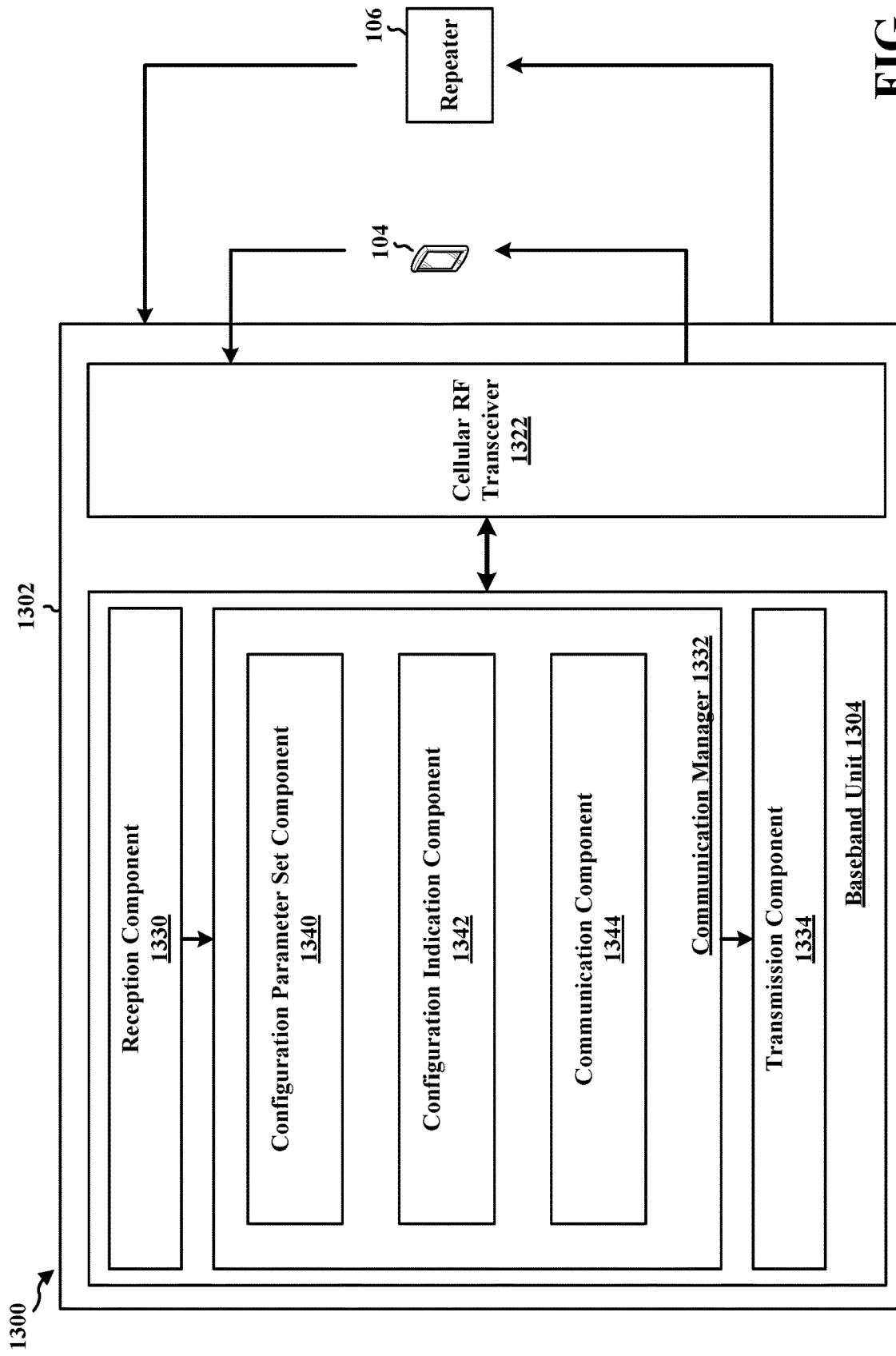
FIG. 13 is a diagram illustrating an example of a hardware implementation for an apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a configuration parameter set reception component 1340 that is configured to transmit, to the RU, the plurality of sets of RU configuration parameters, e.g., as described in connection with 1002 and 1102 of FIGS. 10 and 11. The communication manager 1332 further includes a configuration indication component 1342 that may be configured to transmit, to the RU, an indication of a first set of RU configuration parameters in the plurality of sets of RU configuration parameters for the RU to perform at least one repeating operation associated with facilitating a communication between the first UE and one of the control node or a second wireless device, e.g., as described in connection with 1004 and 1104 of FIGS. 10 and 11. The communication manager 1332 further includes a communication component 1344 that may be configured to receive, from the RU, a transmission associated with a first UE, e.g., as described in connection with 1106 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a RU, a plurality of sets of RU configuration parameters. The apparatus may further include means for transmitting, to the RU, an indication of a first set of RU configuration parameters in the plurality of sets of RU configuration parameters for the RU to perform at least one repeating operation associated with facilitating a communication between the first UE and one of the control node or the second wireless device. The apparatus may further include means for receiving, from the RU, a transmission associated with a first UE. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
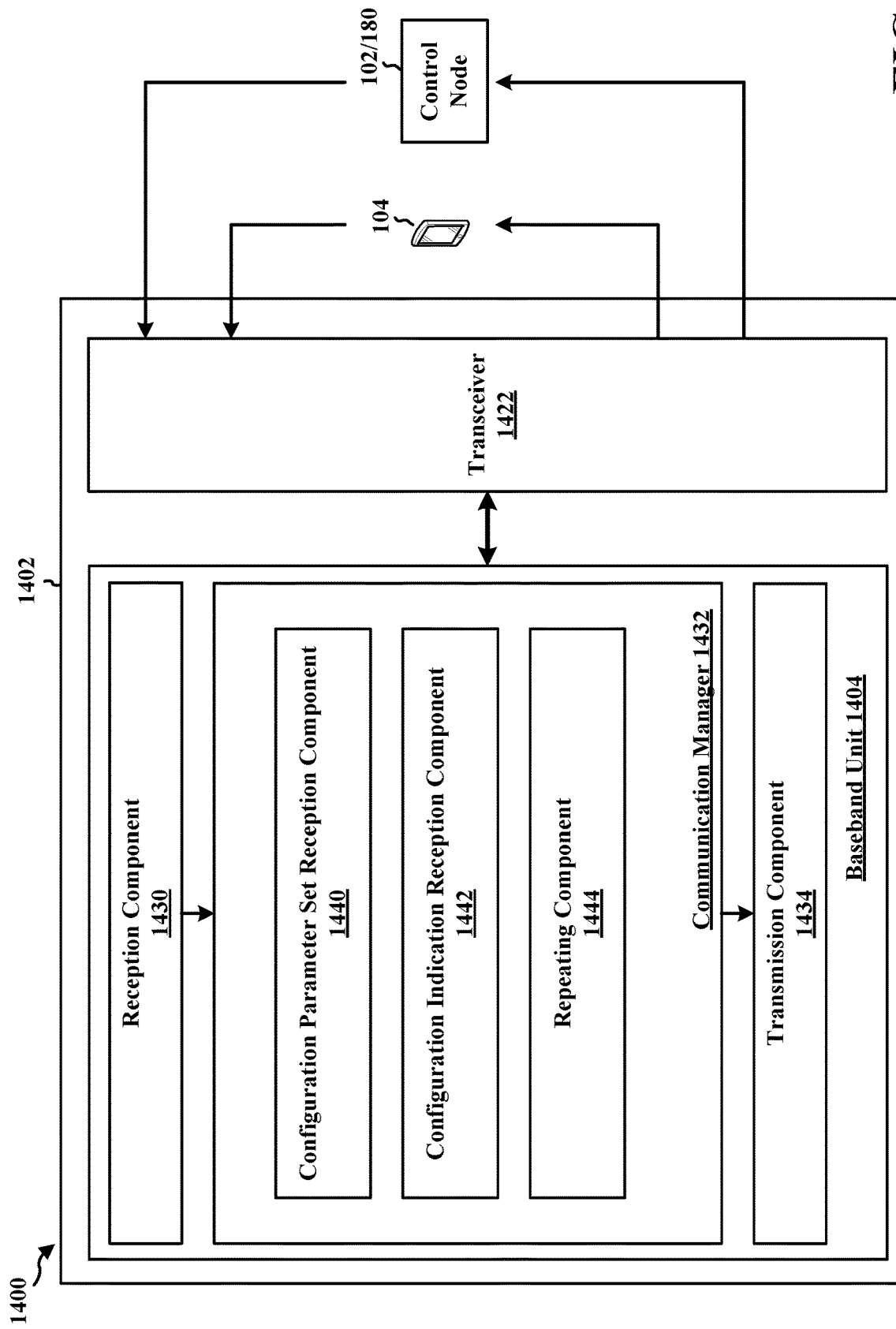
FIG. 14 is a diagram illustrating an example of a hardware implementation for an apparatus.

FIG. 14 is a diagram 1400 illustrating an example of a hardware implementation for an apparatus 1402. The apparatus 1402 may be a repeater, a component of a repeater, or may implement repeater functionality. In some aspects, the apparatus 1402 may include a baseband unit 1404. The baseband unit 1404 may communicate through a transceiver 1422 with the UE 104 and/or the control node 102/180. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the repeater 103 and may include the memory 376 and/or at least one of the TX processor 316, the RX processor 370, and the controller/processor 375, such as described in connection with the base station 310.

The communication manager 1432 includes a configuration parameter set reception component 1440 that may receive a plurality of sets of RU configuration parameters, e.g., as described in connection with 702 of FIG. 7. The communication manager 1432 further includes a configuration indication reception component 1442 that may receive an indication of a first set of RU configuration parameters in the plurality of sets of RU configuration parameters, e.g., as described in connection with 704 of FIG. 7. The communication manager 1432 further includes a repeating component 1444 that may perform at least one repeating operation based on the first set of RU configuration parameters, e.g., as described in connection with 706 of FIG. 7.

The apparatus may include additional components that perform each of the blocks of the algorithm in the flowcharts of FIG. 7. As such, each block in the flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving a plurality of sets of RU configuration parameters. The apparatus, in some aspects, includes means for receiving an indication of a first set of RU configuration parameters in the plurality of sets of RU configuration parameters. The apparatus includes means for performing at least one repeating operation based on the first set of RU configuration parameters, the at least one repeating operation being performed to facilitate a communication between a first wireless device and a second wireless device. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

In wireless communications, repeaters may be used to extend network coverage. A repeater may include a repeating unit for amplification and forwarding operations between two wireless nodes, such as between a base station and a UE. Repeaters may be a simple and cost-effective manner to improve network coverage. Some repeaters, such as integrated access and backhaul (IAB) nodes, may operate as a decode-and-forward relay node where minimal processing on the incoming signal is performed and the incoming signal is amplified and forwarded. Repeaters may be used to extend coverage and to overcome physical blockage of signals in many cases.

Aspects presented herein provide a configurable repeater (e.g., a network-controlled repeater) including a mobile terminal for receiving control information from a control node and a repeater unit. The configurable repeater may provide further improvements beyond those provided by a non-configurable repeater that merely amplifies a received signal, by providing for control of the amplified signal.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a RU including at least one processor coupled to a memory and configured to receive a plurality of sets of RU configuration parameters, receive an indication of a first set of RU configuration parameters in the plurality of sets of RU configuration parameters, and perform at least one repeating operation based on the first set of RU configuration parameters, the at least one repeating operation being performed to facilitate a communication between a first wireless device and a second wireless device.

Aspect 2 is the apparatus of aspect 1, where the first wireless device is a base station and the second wireless device is a UE, and where the plurality of sets of RU configuration parameters is received from the first wireless device and the indication of the first set of RU configuration parameters is received from one of the first wireless device or the second wireless device.

Aspect 3 is the apparatus of any of aspects 1 and 2, where the first wireless device is a first UE and the second wireless device is a second UE, and where the plurality of sets of RU configuration parameters is received from one of the first UE or a base station and the indication of the first set of RU configuration parameters is received from one of the first UE, the second UE or the base station.

Aspect 4 is the apparatus of any of aspects 1 to 3, where the plurality of sets of configuration parameters is received via one of a RRC message or a MAC-CE.

Aspect 5 is the apparatus of any of aspects 1 to 4, where the indication of the first set of RU configuration parameters is received via one of DCI, UCI, or SCI.

Aspect 6 is the apparatus of any of aspects 1 to 5, where each set of RU configuration parameters in the plurality of sets of RU configuration parameters is associated with a beam index and the indication of the first set of RU configuration parameters includes a beam index value associated with the first set of RU configuration parameters, or where each set of RU configuration parameters in the plurality of sets of RU configuration parameters is associated with a parameter set index and the indication of the first set of RU configuration parameters includes a parameter set index value associated with the first set of RU configuration parameters.

Aspect 7 is the apparatus of any of aspects 1 to 5, where each set of RU configuration parameters in the plurality of sets of RU configuration parameters is associated with a UE index and the indication includes a UE index value associated with the first set of RU configuration parameters, the UE index value being one of a RNTI associated with a UE and extracted by the RU from a PDCCH transmission or a local UE index value that is configured for identifying UEs at the RU.

Aspect 8 is the apparatus of any of aspects 1 to 7, where each set of RU configuration parameters includes a beamforming configuration and a time-domain resource allocation associated with the beamforming configuration.

Aspect 9 is the apparatus of any of aspects 1 to 8, where each set of RU configuration parameters includes one or more of a transmission power configuration, an operating bandwidth, an On-Off schedule indicating times at which the RU may be inactive, a directionality indication that indicates that the first set of RU configuration parameters applies to one or more of a downlink transmission or an uplink transmission or a sidelink transmission, a timing reference indication that indicates one or more timing parameters associated with repeating transmissions received at the RU.

Aspect 10 is the apparatus of any of aspects 1 to 9, further including a transceiver coupled to the at least one processor, where the plurality of sets of RU configuration parameters is one of a first plurality of sets of repeater-unit-specific configuration parameters, a second plurality of sets of cell-specific RU configuration parameters, or a third plurality of repeater-unit-group configuration parameters.

Aspect 11 is an apparatus for wireless communication at a first UE including at least one processor coupled to a memory and configured to receive, from at least one of a base station, a RU, or a second UE, a plurality of sets of RU configuration parameters associated with one of a beam index, a UE index, or a parameter set index; and communicate, via a RU, with one of the second UE or the base station based on a first set of RU configuration parameters in the plurality of sets of RU configuration parameters, the RU being associated with the plurality of sets of RU configuration parameters.

Aspect 12 is the apparatus of aspect 11, where the at least one processor is further configured to transmit, to at least one of the base station, the RU, or the second UE, an indication of the first set of RU configuration parameters.

Aspect 13 is the apparatus of aspect 12, where the indication of the first set of RU configuration parameters is transmitted via SCI.

Aspect 14 is the apparatus of any of aspects 12 and 13, where each set of RU configuration parameters in the plurality of sets of RU configuration parameters is associated with the beam index and the indication of the first set of RU configuration parameters includes a beam index value associated with the first set of RU configuration parameters, or where each set of RU configuration parameters in the plurality of sets of RU configuration parameters is associated with the parameter set index and the indication of the first set of RU configuration parameters includes a parameter set index value associated with the first set of RU configuration parameters.

Aspect 15 is the apparatus of any of aspects 12 and 13, where each set of RU configuration parameters in the plurality of sets of RU configuration parameters is associated with the UE index and the indication of the first set of RU configuration parameters includes a UE index value associated with the first set of RU configuration parameters, the UE index value being one of a RNTI associated with the UE or a local UE index value that identifies the first UE at the RU.

Aspect 16 is the apparatus of any of aspects 11 to 15, where the at least one processor is further configured to transmit, to the RU, the plurality of sets of RU configuration parameters.

Aspect 17 is the apparatus of any of aspects 11 to 16, further including a transceiver coupled to the at least one processor, where the at least one processor is further configured to receive, from at least one of the base station, the RU, or the second UE, an indication of the first set of RU configuration parameters.

Aspect 18 is an apparatus for wireless communication at a control node including at least one processor coupled to a memory and configured to transmit, to a repeater unit (RU), a plurality of sets of RU configuration parameters; and transmit, to the RU, an indication of a first set of RU configuration parameters in the plurality of sets of RU configuration parameters for the RU to perform at least one repeating operation associated with facilitating a communication between a first UE and one of the control node or a second wireless device.

Aspect 19 is the apparatus of aspect 18, where the control node is a base station and the second wireless device is the base station, and the at least one processor is further configured to receive, from the RU, a transmission associated with the first UE.

Aspect 20 is the apparatus of any of aspects 18 and 19, where the plurality of sets of RU configuration parameters is transmitted via one of a RRC message or a MAC-CE.

Aspect 21 is the apparatus of any of aspects 18 to 20, where the indication of the first set of RU configuration parameters is transmitted via one of DCI or SCI.

Aspect 22 is the apparatus of any of aspects 18 to 21, where each set of RU configuration parameters in the plurality of sets of RU configuration parameters is associated with a beam index and the indication of the first set of RU configuration parameters includes a beam index value associated with the first set of RU configuration parameters, or where each set of RU configuration parameters in the plurality of sets of RU configuration parameters is associated with a parameter set index and the indication of the first set of RU configuration parameters includes a parameter set index value associated with the first set of RU configuration parameters.

Aspect 23 is the apparatus of any of aspects 18 to 22, where each set of RU configuration parameters in the plurality of sets of RU configuration parameters is associated with a UE index and the indication of the first set of RU configuration parameters includes a UE index value associated with the first set of RU configuration parameters, the UE index value being one of a RNTI associated with the first UE and extracted by the RU from a PDCCH transmission or a local UE index value that identifies the first UE at the RU.

Aspect 24 is the apparatus of any of aspects 18 to 23, where each set of RU configuration parameters includes a beamforming configuration and a time-domain resource allocation associated with the beamforming configuration.

Aspect 25 is the apparatus of any of aspects 18 to 24, where each set of RU configuration parameters includes one or more of a transmission power configuration, an operating bandwidth, an On-Off schedule indicating times at which the RU may be inactive, a directionality indication that indicates that the first set of RU configuration parameters applies to one or more of a downlink transmission or an uplink transmission, a timing reference indication that indicates one or more timing parameters associated with repeating transmissions received at the RU.

Aspect 26 is the apparatus of any of aspects 18 to 25, where further including a transceiver coupled to the at least one processor, where transmitting the plurality of sets of RU configuration parameters further includes one of (1) transmitting the plurality of sets of RU configuration parameters to a plurality of RUs in a same cell as the control node, where the plurality of sets of RU configuration parameters are a first plurality of sets of cell-specific RU configurations or (2) transmitting the plurality of sets of RU configuration parameters to a group of RUs in a same group as the RU, where the plurality of sets of RU configuration parameters are a second plurality of sets of group-specific RU configurations.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. An apparatus for wireless communication at a repeater unit (RU), comprising:
   memory; and
   at least one processor coupled to the memory and configured to:
      receive a plurality of sets of RU configuration parameters, wherein each set of RU configuration parameters comprises a beamforming configuration for transmission and reception;
      receive an indication of a first set of RU configuration parameters in the plurality of sets of RU configuration parameters comprising a first beamforming configuration indicating a first beam to use for reception from a first wireless device and a second beam to use for transmission to a second wireless device; and
      perform at least one repeating operation based on the first set of RU configuration parameters, the at least one repeating operation being performed to facilitate a communication between the first wireless device and the second wireless device.

2. The apparatus of claim 1, wherein the first wireless device is a base station and the second wireless device is a user equipment (UE), and wherein to receive the plurality of sets of RU configuration parameters, the at least one processor is configured to receive the plurality of sets of RU configuration parameters from the first wireless device, and to receive the indication of the first set of RU configuration parameters, the at least one processor is configured to receive the indication of the first set of RU configuration parameters from one of the first wireless device or the second wireless device.

3. The apparatus of claim 1, wherein the first wireless device is a first user equipment (UE) and the second wireless device is a second UE, and wherein to receive the plurality of sets of RU configuration parameters, the at least one processor is configured to receive the plurality of sets of RU configuration parameters from one of the first UE or a base station, and to receive the indication of the first set of RU configuration parameters, the at least one processor is configured to receive the indication of the first set of RU configuration parameters from one of the first UE, the second UE or the base station.

4. The apparatus of claim 1, wherein to receive the plurality of sets of RU configuration parameters, the at least one processor is configured to receive the plurality of sets of RU configuration parameters via one of a radio resource control (RRC) message or a medium access control (MAC) control element (CE) (MAC-CE).

5. The apparatus of claim 1, wherein to receive the indication of the first set of RU configuration parameters, the at least one processor is configured to receive the indication of the first set of RU configuration parameters is received via one of downlink control information (DCI), uplink control information (UCI), or sidelink control information (SCI).

6. The apparatus of claim 1, wherein:
   each set of RU configuration parameters in the plurality of sets of RU configuration parameters is associated with a beam index and the indication of the first set of RU configuration parameters comprises a beam index value associated with the first set of RU configuration parameters; or
   each set of RU configuration parameters in the plurality of sets of RU configuration parameters is associated with a parameter set index and the indication of the first set of RU configuration parameters comprises a parameter set index value associated with the first set of RU configuration parameters.

7. The apparatus of claim 1, wherein each set of RU configuration parameters in the plurality of sets of RU configuration parameters is associated with a user equipment (UE) index and the indication comprises a UE index value associated with the first set of RU configuration parameters, the UE index value being one of a radio network temporary identifier (RNTI) associated with a UE and extracted by the RU from a physical downlink control channel (PDCCH) transmission or a local UE index value that is configured for identifying UEs at the RU.

8. The apparatus of claim 1, wherein each set of RU configuration parameters comprises a time-domain resource allocation associated with the beamforming configuration.

9. The apparatus of claim 1, wherein each set of RU configuration parameters comprises one or more of a transmission power configuration, an operating bandwidth, an On-Off schedule indicating times at which the RU may be inactive, a directionality indication that indicates that the first set of RU configuration parameters applies to one or more of a downlink transmission or an uplink transmission or a sidelink transmission, a timing reference indication that indicates one or more timing parameters associated with repeating transmissions received at the RU.

10. The apparatus of claim 1, further comprising a transceiver coupled to the at least one processor, wherein the plurality of sets of RU configuration parameters is one of a first plurality of sets of repeater-unit-specific configuration parameters, a second plurality of sets of cell-specific RU configuration parameters, or a third plurality of repeater-unit-group configuration parameters.

11. An apparatus for wireless communication at a first user equipment (UE), comprising:
memory; and
at least one processor coupled to the memory and configured to:
receive, from at least one of a base station, a repeater unit (RU), or a second UE, a plurality of sets of RU configuration parameters associated with one of a beam index, a UE index, or a parameter set index, wherein each set of RU configuration parameters comprises a beamforming configuration for transmission and reception; and
communicate, via the RU, with one of the second UE or the base station based on a first set of RU configuration parameters in the plurality of sets of RU configuration parameters, wherein the first set of RU configuration parameters comprises a first beamforming configuration indicating a beam to use for transmission from the first UE to the RU, the RU being associated with the plurality of sets of RU configuration parameters.

12. The apparatus of claim 11, wherein the at least one processor is further configured to:
transmit, to at least one of the base station, the RU, or the second UE, an indication of the first set of RU configuration parameters.

13. The apparatus of claim 12, wherein to transmit the indication of the first set of RU configuration parameters, the at least one processor is configured to transmit the indication of the first set of RU configuration parameters via sidelink control information (SCI).

14. The apparatus of claim 12, wherein:
each set of RU configuration parameters in the plurality of sets of RU configuration parameters is associated with the beam index and the indication of the first set of RU configuration parameters comprises a beam index value associated with the first set of RU configuration parameters; or
each set of RU configuration parameters in the plurality of sets of RU configuration parameters is associated with the parameter set index and the indication of the first set of RU configuration parameters comprises a parameter set index value associated with the first set of RU configuration parameters.

15. The apparatus of claim 12, wherein each set of RU configuration parameters in the plurality of sets of RU configuration parameters is associated with the UE index and the indication of the first set of RU configuration parameters comprises a UE index value associated with the first set of RU configuration parameters, the UE index value being one of a radio network temporary identifier (RNTI) associated with the UE or a local UE index value that identifies the first UE at the RU.

16. The apparatus of claim 11, wherein the at least one processor is further configured to:
transmit, to the RU, the plurality of sets of RU configuration parameters.

17. The apparatus of claim 11, further comprising a transceiver coupled to the at least one processor, wherein the at least one processor is further configured to:
receive, from at least one of the base station, the RU, or the second UE, an indication of the first set of RU configuration parameters.

18. An apparatus for wireless communication at a control node, comprising:
memory; and
at least one processor coupled to the memory and configured to:
transmit, to a repeater unit (RU), a plurality of sets of RU configuration parameters, wherein each set of RU configuration parameters comprises a beamforming configuration for transmission and reception; and
transmit, to the RU, an indication of a first set of RU configuration parameters in the plurality of sets of RU configuration parameters for the RU to perform at least one repeating operation associated with facilitating a communication between a first user equipment (UE) and one of the control node or a second wireless device, wherein the first set of RU configuration parameters comprises a first beamforming configuration indicating a first beam to use for reception from the first UE and a second beam to use for transmission to one of the control node or the second wireless device.

19. The apparatus of claim 18, wherein the control node is a base station and the second wireless device is the base station, and the at least one processor is further configured to:
receive, from the RU, a transmission associated with the first UE.

20. The apparatus of claim 18, wherein to transmit the plurality of sets of RU configuration parameters, the at least one processor is configured to transmit the plurality of sets of RU configuration parameters via one of a radio resource control (RRC) message or a medium access control (MAC) control element (CE) (MAC-CE).

21. The apparatus of claim 18, wherein to transmit the indication of the first set of RU configuration parameters, the at least one processor is configured to transmit the indication of the first set of RU configuration parameters via one of downlink control information (DCI) or sidelink control information (SCI).

22. The apparatus of claim 18, wherein:
each set of RU configuration parameters in the plurality of sets of RU configuration parameters is associated with a beam index and the indication of the first set of RU configuration parameters comprises a beam index value associated with the first set of RU configuration parameters; or
each set of RU configuration parameters in the plurality of sets of RU configuration parameters is associated with a parameter set index and the indication of the first set of RU configuration parameters comprises a parameter set index value associated with the first set of RU configuration parameters.

23. The apparatus of claim 18, wherein each set of RU configuration parameters in the plurality of sets of RU configuration parameters is associated with a UE index and the indication of the first set of RU configuration parameters comprises a UE index value associated with the first set of RU configuration parameters, the UE index value being one of a radio network temporary identifier (RNTI) associated with the first UE and extracted by the RU from a physical downlink control channel (PDCCH) transmission or a local UE index value that identifies the first UE at the RU.

24. The apparatus of claim 18, wherein each set of RU configuration parameters comprises a time-domain resource allocation associated with the beamforming configuration.

25. The apparatus of claim 18, wherein each set of RU configuration parameters comprises one or more of a transmission power configuration, an operating bandwidth, an On-Off schedule indicating times at which the RU may be inactive, a directionality indication that indicates that the first set of RU configuration parameters applies to one or more of a downlink transmission or an uplink transmission, a timing reference indication that indicates one or more timing parameters associated with repeating transmissions received at the RU.

26. The apparatus of claim 18, further comprising a transceiver coupled to the at least one processor, wherein transmitting the plurality of sets of RU configuration parameters further comprises one of (1) transmitting the plurality of sets of RU configuration parameters to a plurality of RUs in a same cell as the control node, wherein the plurality of sets of RU configuration parameters are a first plurality of sets of cell-specific RU configurations or (2) transmitting the plurality of sets of RU configuration parameters to a group of RUs in a same group as the RU, wherein the plurality of sets of RU configuration parameters are a second plurality of sets of group-specific RU configurations.

27. A method of wireless communication at a repeater unit (RU), comprising:
receiving a plurality of sets of RU configuration parameters, wherein each set of RU configuration parameters comprises a beamforming configuration for transmission and reception;
receiving an indication of a first set of RU configuration parameters in the plurality of sets of RU configuration parameters comprising a first beamforming configuration indicating a first beam to use for reception from a first wireless device and a second beam to use for transmission to a second wireless device; and
performing at least one repeating operation based on the first set of RU configuration parameters, the at least one repeating operation being performed to facilitate a communication between the first wireless device and the second wireless device.

28. The method of claim 27, wherein:
the first wireless device is a base station and the second wireless device is a user equipment (UE), and wherein the plurality of sets of RU configuration parameters is received from the first wireless device and the indication of the first set of RU configuration parameters is received from one of the first wireless device or the second wireless device; or the first wireless device is a first UE and the second wireless device is a second UE, and wherein the plurality of sets of RU configuration parameters is received from one of the first UE or the base station and the indication of the first set of RU configuration parameters is received from one of the first UE, the second UE or the base station.

29. The method of claim 27, wherein:
each set of RU configuration parameters in the plurality of sets of RU configuration parameters is associated with a beam index and the indication of the first set of RU configuration parameters comprises a beam index value associated with the first set of RU configuration parameters;
each set of RU configuration parameters in the plurality of sets of RU configuration parameters is associated with a parameter set index and the indication of the first set of RU configuration parameters comprises a parameter set index value associated with the first set of RU configuration parameters; or
each set of RU configuration parameters in the plurality of sets of RU configuration parameters is associated with a user equipment (UE) index and the indication comprises a UE index value associated with the first set of RU configuration parameters, the UE index value being one of a radio network temporary identifier (RNTI) associated with a UE and extracted by the RU from a physical downlink control channel (PDCCH) transmission or a local UE index value that is configured for identifying UEs at the RU.

30. The method of claim 27, wherein each set of RU configuration parameters comprises one or more of a time-domain resource allocation associated with the beamforming configuration, a transmission power configuration, an operating bandwidth, an On-Off schedule indicating times at which the RU may be inactive, a directionality indication that indicates that the first set of RU configuration parameters applies to one or more of a downlink transmission or an uplink transmission or a sidelink transmission, a timing reference indication that indicates one or more timing parameters associated with repeating transmissions received at the RU.

* * * * *